United States Patent
Uchida et al.

(10) Patent No.: US 11,614,212 B2
(45) Date of Patent: Mar. 28, 2023

(54) VEHICLE ILLUMINATION LAMP

(71) Applicant: KOITO MANUFACTURING CO., LTD., Tokyo (JP)

(72) Inventors: Naoki Uchida, Shizuoka (JP); Masanori Kito, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 34 days.

(21) Appl. No.: 17/478,035

(22) Filed: Sep. 17, 2021

(65) Prior Publication Data

US 2022/0003377 A1 Jan. 6, 2022

Related U.S. Application Data

(62) Division of application No. 16/608,357, filed as application No. PCT/JP2018/015112 on Apr. 10, 2018, now Pat. No. 11,156,335.

(30) Foreign Application Priority Data

Apr. 28, 2017 (JP) .................................. 2017-090706
Apr. 28, 2017 (JP) .................................. 2017-090707
(Continued)

(51) Int. Cl.
*F21S 41/20* (2018.01)
*F21S 41/16* (2018.01)
(Continued)

(52) U.S. Cl.
CPC ............. *F21S 41/285* (2018.01); *F21S 41/16* (2018.01); *G02B 5/1866* (2013.01); *F21W 2102/18* (2018.01); *F21Y 2113/10* (2016.08)

(58) Field of Classification Search
CPC .. F21S 41/16; F21S 41/20; F21S 41/28; F21S 41/285; G02B 5/1866; F21W 2102/18; F21Y 2113/10
See application file for complete search history.

(56) References Cited

U.S. PATENT DOCUMENTS 10,100,995 B2 * 10/2018 Hirata ................. G03B 21/145
2013/0250381 A1  9/2013 Toko et al.
(Continued)

FOREIGN PATENT DOCUMENTS

EP  0650865 A2  5/1995
EP  0660139 A1  6/1995
(Continued)

OTHER PUBLICATIONS

Office Action dated Feb. 15, 2022 in Japanese Application No. 2019-514360.
(Continued)

*Primary Examiner* — Jason M Han
(74) *Attorney, Agent, or Firm* — Sughrue Mion, PLLC

(57) ABSTRACT

A vehicle headlight (1), which is one aspect of a vehicle illumination lamp, includes: light sources (52R, 52G, 52B), and diffraction gratings (54R, 54G, 54B) for diffracting light incident from the light sources (52R, 52G, 52B). The light diffracted by the diffraction gratings (54R, 54G, 54B) is irradiated in a predetermined light distribution pattern. A projection area (AR) to which are projected components ($LC_R$, $LC_G$, $LC_B$) advancing and passing through the diffraction gratings (54R, 54G, 54B) among the light incident on the diffraction gratings (54R, 54G, 54B) is positioned below the light distribution pattern and within a range (RNG) in which a field of view of a driver of a vehicle is obstructed by the vehicle.

8 Claims, 15 Drawing Sheets

(30) Foreign Application Priority Data

| Apr. 28, 2017 | (JP) | 2017-090708 |
|---|---|---|
| Apr. 28, 2017 | (JP) | 2017-090709 |
| Apr. 28, 2017 | (JP) | 2017-090710 |

(51) Int. Cl.
- *G02B 5/18* (2006.01)
- *F21Y 113/10* (2016.01)
- *F21W 102/18* (2018.01)

(56) References Cited

U.S. PATENT DOCUMENTS

| 2016/0229331 A1 | 8/2016 | Adachi |
| 2017/0315375 A1 | 12/2017 | Kurashige et al. |
| 2019/0265500 A1 | 8/2019 | Kurashige et al. |

FOREIGN PATENT DOCUMENTS

| EP | 2 642 187 A1 | 9/2013 |
|---|---|---|
| EP | 3543592 A1 | 9/2019 |
| JP | 03120513 A | 5/1991 |
| JP | 2004-252253 A | 9/2004 |
| JP | 2006-147377 A | 6/2006 |
| JP | 2010-135069 A | 6/2010 |
| JP | 2012-146621 A | 8/2012 |
| JP | 2013-171645 A | 9/2013 |
| JP | 2013-196957 A | 9/2013 |
| JP | 2017-9782 A | 1/2017 |
| JP | 2017-068948 A | 4/2017 |
| WO | 2013117923 A1 | 8/2013 |
| WO | 2015/040993 A1 | 3/2015 |
| WO | 2016/072484 A1 | 5/2016 |
| WO | 2016072503 A1 | 5/2016 |

OTHER PUBLICATIONS

Office Action dated Aug. 23, 2022 in Japanese Application No. 2019-514360.

Communication dated Oct. 29, 2021 from the China National Intellectual Property Administration in Chinese Application No. 201880027235.6.

International Search Report for PCT/JP2018/015112, dated Jul. 10, 2018.

Communication dated Jan. 26, 2021, from the European Patent Office in application No. 18790592.2.

\* cited by examiner

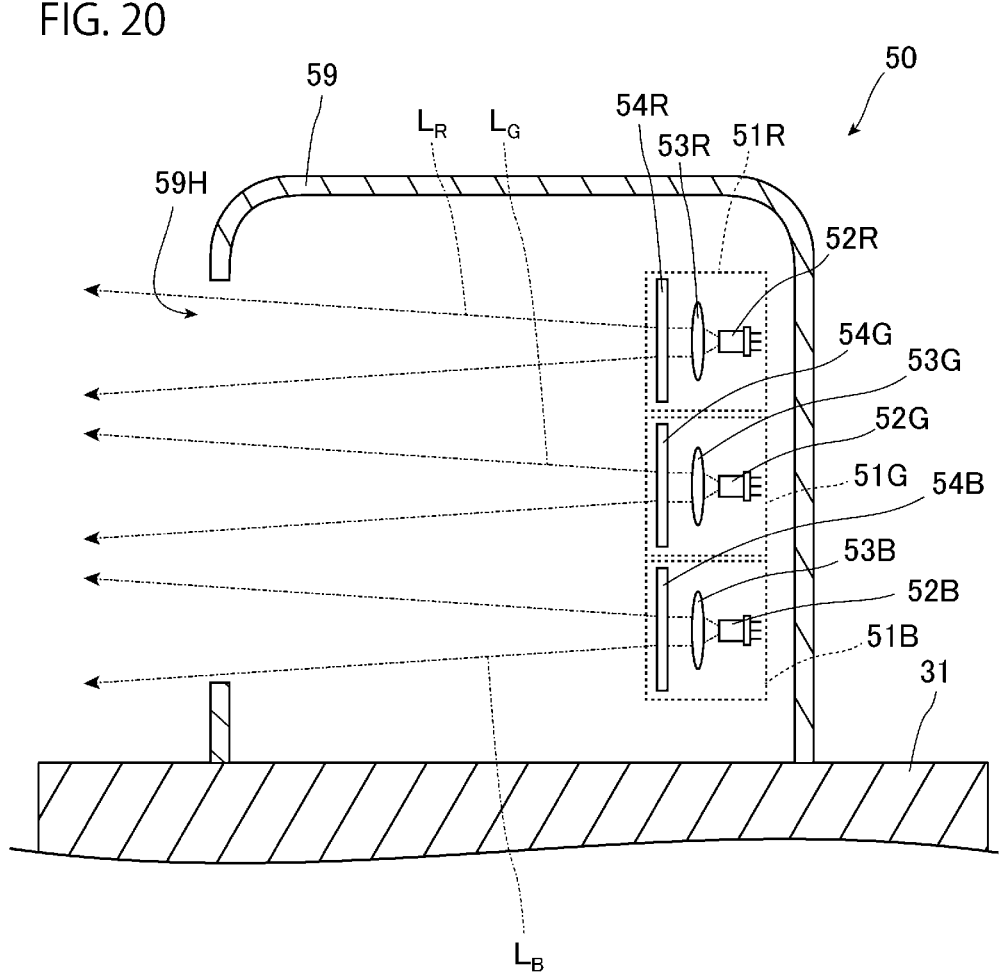

VEHICLE ILLUMINATION LAMP

CROSS REFERENCE TO RELATED APPLICATIONS

This application is a divisional application of U.S. application Ser. No. 16/608,357, filed Oct. 25, 2019, which is a National Stage of International Application No. PCT/JP2018/015112 filed Apr. 10, 2018, claiming priority based on Japanese Patent Application No. 2017-090706 filed Apr. 28, 2017, Japanese Patent Application No. 2017-090707 filed Apr. 28, 2017, Japanese Patent Application No. 2017-090708 filed Apr. 28, 2017, Japanese Patent Application No. 2017-090709 filed Apr. 28, 2017 and Japanese Patent Application No. 2017-0907010 filed Apr. 28, 2017.

TECHNICAL FIELD

The present invention relates to a vehicle illumination lamp and a vehicle headlight.

BACKGROUND ART

A vehicle headlight represented by an automobile headlight is configured to at least irradiate a low beam for illuminating the front at night. In order to form a light distribution pattern of this low beam, a shade is used for shielding a part of light emitted from a light source. However, due to the diversification of vehicle designs, there is a demand for reducing the size with respect to a vehicle headlight.

Patent Literature 1 describes a vehicle headlight that can form a light distribution pattern of a low beam without using a shade. This vehicle headlight includes a hologram element, and a light source that irradiates the hologram element with reference light. The hologram element is calculated so that diffracted light reproduced by irradiating the reference light forms a light distribution pattern of a low beam. Since this vehicle headlight forms a light distribution pattern of a low beam by such a hologram element, a shade is not required, and a reduction in size is possible.
[Patent Literature 1] JP2012-146621 A

SUMMARY OF INVENTION

A vehicle illumination lamp of the present invention includes a light source, and a diffraction grating for diffracting light incident from the light source, in which light diffracted by the diffraction grating is irradiated in a predetermined light distribution pattern, and a projection area to which are projected components advancing and passing through the diffraction grating among the light incident on the diffraction grating is positioned below the light distribution pattern and within a range in which a field of view of a driver of a vehicle is obstructed by the vehicle.

The components advancing and passing through the diffraction grating correspond to 0th-order light, and have a high light intensity compared to a light intensity of high order light from 1st-order light onwards. However, in the vehicle illumination lamp according to the present invention, since the projection area to which are projected the components corresponding 0th-order light is positioned within a range where a field of view of a driver of a vehicle is obstructed by the vehicle, it is possible to suppress a reduction in a driver's ability to pay attention due to the components. Accordingly, it can be easier to operate compared to the case where 0th-order light is in a field of view of a driver of an automobile.

Moreover, the light distribution pattern may be a light distribution pattern of a low beam. In this case, in the vehicle illumination lamp of the present invention, a light distribution pattern of a low beam can be formed without using a shade, by having light diffracted by the diffraction grating irradiated in a light distribution pattern of the low beam. Accordingly, it is possible to reduce in size compared to a vehicle illumination lamp that uses a shade.

Moreover, the light distribution pattern may have a light intensity distribution. In this case, if a light intensity distribution is set in which a central portion of the light distribution pattern is bright and peripheral portions other than the central portion are relatively dark, it is possible to achieve a natural light distribution pattern that does not provide a driver with a sense of discomfort.

Moreover, it may include a plurality of light emitting optical systems including one light source and one diffraction grating, and a synthesis optical system for synthesizing light emitted from the respective light emitting optical systems, the light sources in the respective light emitting optical systems may emit light of mutually different predetermined wavelengths, and the diffraction gratings in the respective light emitting optical systems may diffract light from the light sources so that the light synthesized by the synthesis optical system has a light distribution pattern of a low beam.

In this case, in the respective light emitting optical systems, light of a predetermined wavelength emitted from the light source is diffracted by the diffraction grating, and a light distribution pattern is formed. At this time, in the respective light emitting optical systems, since light diffracted by the diffraction grating has a predetermined wavelength such as described above, it is possible to suppress color bleeding from occurring near edges of a light distribution pattern in light emitted from the respective diffraction gratings, even if the diffraction grating has a wavelength dependency. In this way, light having a light distribution pattern in which color bleeding is suppressed is synthesized by a synthesis optical system, and a light distribution pattern of a low beam is formed. Therefore, it is possible for a low beam irradiated by the vehicle illumination lamp of the present invention to suppress color bleeding from appearing near edges of a light distribution pattern.

Moreover, components advancing and passing through the diffraction gratings in the respective light emitting optical systems may be synthesized by the synthesis optical system, and may be projected to the projection area. In this case, components advancing and passing through the respective diffraction gratings can be made a same color, even if the diffraction grating has a wavelength dependency such as described above. Therefore, it is possible to reduce pedestrians or the like outside a vehicle from being unnecessarily aware of the projection area.

Moreover, the vehicle illumination lamp of the present invention includes a light source, a diffraction grating for diffracting light incident from the light source, and an optical element disposed, between a projection area of light components advancing and passing through the diffraction grating and the diffraction grating, on an optical path of the light components, the optical element lowering an energy density of light, in which light diffracted by the diffraction grating among the light emitted from the diffraction grating is irradiated in a predetermined light distribution pattern.

The light components advancing and passing through the diffraction grating correspond to the 0th-order light, and the light diffracted by the diffraction grating corresponds to the high order diffracted light. Accordingly, the light advancing and passing through the diffraction grating tends to have a high light intensity compared to a light intensity of light diffracted by the diffraction grating. However, in the case of the vehicle illumination lamp of the present invention, an optical element for lowering an energy density of light is disposed, between a projection area of the light components corresponding to the 0th-order light and the diffraction grating, on an optical path of the light components. Therefore, even if a light intensity of the light components advancing and passing through the diffraction grating is higher than a light intensity of light diffracted by the diffraction grating, among light emitted from the diffraction grating, an energy density of the light components can be lowered to less than that of the optical element. Accordingly, it is possible to suppress the projection area of the light components advancing and passing through the diffraction grating from becoming noticeably brighter than a light distribution pattern by the light diffracted by the diffraction grating among the light emitted from the diffraction grating. In this way, the vehicle illumination lamp of the present invention can be easily operated compared to the case where not including the optical element.

Moreover, in the case where including an optical element for lowering an energy density of light, a housing for accommodating the light source and the diffraction grating may be included, and the optical element may be disposed in the housing. In this case, there will be a reduction of the light components corresponding to 0th-order light being emitted outside the vehicle. Therefore, it is possible to suppress the projection area of the light components corresponding to 0th-order light from becoming noticeably bright outside the vehicle, and as a result of this, it is possible to suppress a driver, pedestrian or the like from being unnecessarily aware of the projection area.

Moreover, in the case where including an optical element for lowering an energy density of light, the optical element may be a light shielding element or a light diffusing element. Accordingly, in the vehicle illumination lamp of the present invention, a light shielding element or a light diffusing element can be selected as the optical element, in accordance with the type or the like of a vehicle mounted with the vehicle illumination lamp.

Moreover, in the case where including an optical element for lowering an energy density of light, the projection area may be positioned outside of the light distribution pattern. In this case, it is possible to suppress a part of the light distribution pattern from becoming noticeably bright, compared to the case where the projection area is positioned within the light distribution pattern, and as a result of this, it can be easier to operate.

Moreover, in the case where including an optical element for lowering an energy density of light, the light distribution pattern may have a predetermined light intensity distribution, and the projection area may be included within an area, among the light distribution pattern, having a light intensity of half a value or less of a highest light intensity within a light intensity distribution of the light diffracted by the diffraction grating.

In this case, it will be easy for the light intensity distribution of the light distribution pattern to be smoothly formed, on the basis of a position having a highest light intensity within the light intensity distribution of light diffracted by the diffraction grating, compared to the case where the projection area is included in an area higher than half a value of a highest light intensity within the light intensity distribution of light diffracted by the diffraction grating.

Moreover, in the case where including an optical element for lowering an energy density of light, a plurality of light emitting optical systems including one light source and one diffraction grating may be included, a synthesis optical system for synthesizing light emitted from the respective light emitting optical systems may be included, the light sources in the respective light emitting optical systems may emit light of mutually different predetermined wavelengths, and the diffraction gratings in the respective light emitting optical systems may diffract light from the light sources so that the light synthesized by the synthesis optical system has the light distribution pattern.

In this case, in the respective light emitting optical systems, light of a predetermined wavelength emitted from the light source is diffracted by the diffraction grating, and a light distribution pattern is formed. At this time, in the respective light emitting optical systems, since light diffracted by the diffraction grating has a predetermined wavelength such as described above, it is possible to suppress color bleeding from occurring near edges of a light distribution pattern in light emitted from the respective diffraction gratings, even if the diffraction grating has a wavelength dependency. In this way, light having a light distribution pattern in which color bleeding is suppressed is synthesized by a synthesis optical system, and a light distribution pattern of a low beam is formed. Therefore, it is possible for a low beam irradiated by the vehicle illumination lamp of the present invention to suppress color bleeding from appearing near edges of a light distribution pattern.

Moreover, in the case where including an optical element for lowering an energy density of light, light components advancing and passing through the diffraction gratings in the respective light emitting optical systems may be synthesized by the synthesis optical system, and the optical element may lower an energy density of the light components synthesized by the synthesis optical system.

In this case, an irradiation area of the light components irradiated on the optical element can be reduced, compared to the case where the light components advancing and passing through the diffraction gratings in the respective light emitting optical systems are not synthesized. Therefore, it is possible to suppress an energy density of light diffracted by the diffraction gratings, among the light emitted from the diffraction gratings, from being lowered by the optical element.

Moreover, a vehicle illumination lamp of the present invention includes a light source, and a diffraction grating for diffracting light incident from the light source, in which a light distribution pattern having a predetermined light intensity distribution is formed by light diffracted by the diffraction grating and light advancing and passing through the diffraction grating, and a projection area of the light advancing and passing through the diffraction grating within the light distribution pattern is positioned within an area having a light intensity higher than half a value of a highest light intensity within a light intensity distribution of the light diffracted by the diffraction grating.

The light advancing and passing through the diffraction grating corresponds to 0th-order light, and the light diffracted by the diffraction grating corresponds to high order diffracted light. Accordingly, the light advancing and passing through the diffraction grating tends to have a high light intensity compared to a light intensity of light diffracted by the diffraction grating. However, in the case of the vehicle illumination lamp of the present invention, the projection area of the light corresponding to 0th-order light is positioned within an area having a light intensity higher than half a value of a highest light intensity within a light intensity distribution of light corresponding to high order diffracted light. Therefore, even if the light corresponding to 0th-order light is irradiated on the projection area, it is possible to suppress the projection area from becoming noticeably bright within the light distribution pattern. Therefore, the vehicle headlight of the present invention can be easily operated, compared to the case where the projection area is disposed outside an area having a light intensity higher than half a value of a highest light intensity within a light intensity distribution of the light diffracted by the diffraction grating.

Moreover, in the case where the projection area of the light corresponding to 0th-order light is positioned within an area having a light intensity higher than half a value of a highest light intensity in a light intensity distribution of the light corresponding to high order diffracted light, it is preferable for the projection area to be positioned to avoid a portion having a highest light intensity within the light intensity distribution. In this case, it is possible to suppress the portion having a highest light intensity within the light intensity distribution of light corresponding to high order diffracted light from becoming excessively bright.

Moreover, in the case where the projection area of the light corresponding to 0th-order light is positioned within an area having a light intensity higher than half a value of a highest light intensity in a light intensity distribution of the light corresponding to high order diffracted light, it is preferable for the area to be a hot zone. In this case, while using the light corresponding to 0th-order light as a light distribution pattern, it is possible to suppress a projection area from becoming noticeably bright in this light distribution pattern.

Moreover, in the case where the projection area of the light corresponding to 0th-order light is positioned within an area having a light intensity higher than half a value of a highest light intensity in a light intensity distribution of the light corresponding to high order diffracted light, the light distribution pattern may be a light distribution pattern of a low beam.

Moreover, in the case where the projection area of the light corresponding to 0th-order light is positioned within an area having a light intensity higher than half a value of a highest light intensity in a light intensity distribution of the light corresponding to high order diffracted light, a plurality of light emitting optical systems including one light source and one diffraction grating may be included, a synthesis optical system for synthesizing light emitted from the respective light emitting optical systems may be included, the light sources in the respective light emitting optical systems may emit light of mutually different predetermined wavelengths, and the diffraction gratings in the respective light emitting optical systems may emit light from the light sources so that the light synthesized by the synthesis optical system has the light distribution pattern.

In this case, light of a predetermined wavelength emitted from the respective light sources forms a light distribution pattern through the diffraction gratings. At this time, in the respective light emitting optical systems, since light diffracted by the diffraction grating has a predetermined wavelength, it is possible to suppress color bleeding from occurring near edges of a light distribution pattern in light emitted from the respective diffraction gratings, even if the diffraction gratings have a wavelength dependency. In this way, light having a light distribution pattern in which color bleeding is suppressed is synthesized by a synthesis optical system, and a light distribution pattern is formed. Therefore, it is possible to suppress color bleeding from appearing near edges of a light distribution pattern.

Moreover, in the case where the projection area of the light corresponding to 0th-order light is positioned within an area having a light intensity higher than half a value of a highest light intensity in a light intensity distribution of the light corresponding to high order diffracted light, components advancing and passing through the diffraction grating in the respective light emitting optical systems may be synthesized by the synthesis optical system, and may be irradiated on the projection area. In this case, the 0th-order light passing through the respective diffraction gratings can be made a same color of white, even if the diffraction grating has a wavelength dependency such as described above. Therefore, it is possible to reduce a driver, pedestrian or the like from being unnecessarily aware of the projection area, and it becomes easier to operate.

Moreover, the vehicle illumination lamp of the present invention includes a light source, and a diffraction grating for diffracting light incident from the light source, in which light emitted from the diffraction grating is irradiated in a light distribution pattern having a predetermined light intensity distribution, and in a projection area of light advancing and passing through the diffraction grating among the light distribution pattern, a light intensity of light diffracted by the diffraction grating and irradiated on the projection area is made smaller than a light intensity of light irradiated to an outside peripheral edge of the projection area.

The light advancing and passing through the diffraction grating corresponds to 0th-order light, and the light diffracted by the diffraction grating corresponds to high order diffracted light. Accordingly, the light advancing and passing through the diffraction grating tends to have a high light intensity compared to a light intensity of light diffracted by the diffraction grating. However, in the case of the vehicle illumination lamp of the present invention, in a projection area of light corresponding to 0th-order light, a light intensity of light corresponding to high order diffracted light is made smaller than a light intensity of light irradiated to an outside peripheral edge of the projection area. Accordingly, even if the light corresponding to 0th-order light is irradiated on the projection area, it is possible to suppress the projection area being noticeably bright within the light distribution pattern. Therefore, the vehicle illumination lamp of the present invention can be easily operated, compared to the case where a light intensity of high order diffracted light in the projection area is equal to or more than a light intensity of light irradiated to an outside peripheral edge of the projection area.

Moreover, in a projection area of light corresponding to 0th-order light, in the case where a light intensity of light corresponding to high order diffracted light is smaller than a light intensity of light irradiated to an outside peripheral edge of the projection area, a total value of the light intensity of light diffracted by the diffraction grating and irradiated on the projection area and a light intensity of light advancing and passing through the diffraction grating and irradiated on the projection area may be made lower than a highest light intensity within a light intensity distribution of light diffracted by the diffraction grating.

In this case, it will be easy for the light intensity distribution of the light distribution pattern to be smoothly formed, on the basis of a position having a highest light intensity within the light intensity distribution of light diffracted by the diffraction grating.

Moreover, in a projection area of light corresponding to 0th-order light, in the case where a light intensity of light corresponding to high order diffracted light is smaller than a light intensity of light irradiated to an outside peripheral edge of the projection area, the light intensity of light diffracted by the diffraction grating and irradiated on the projection area may be zero.

In this case, even in the case where a difference between the light intensity of light corresponding to 0th-order light and the light intensity of light corresponding to high order diffracted light is large, it will be easy to suppress the projection area being noticeably bright within the light distribution pattern, and to form a smooth light intensity distribution as the whole light distribution pattern.

Moreover, in a projection area of light corresponding to 0th-order light, in the case where a light intensity of light corresponding to high order diffracted light is smaller than a light intensity of light irradiated to an outside peripheral edge of the projection area, the projection area may be included within an area having a light intensity higher than half a value of a highest light intensity within a light intensity distribution of light diffracted by the diffraction grating.

In this case, it is possible to suppress the projection area being noticeably bright within the light distribution pattern, compared to the case where the projection area is included in an area of half a value or less of a highest light intensity within a light intensity distribution of light diffracted by the diffraction grating.

Moreover, in a projection area of light corresponding to 0th-order light, in the case where a light intensity of light corresponding to high order diffracted light is smaller than a light intensity of light irradiated to an outside peripheral edge of the projection area, the projection area may include a position having a highest light intensity within the light intensity distribution of light diffracted by the diffraction grating.

In this case, the brightest area within the light distribution pattern will be mostly unchanged, regardless of whether or not the light intensity of light corresponding to 0th-order light is large. Accordingly, a light intensity distribution of the light distribution pattern can be more smoothly formed, on the basis of a position having a highest light intensity within the light intensity distribution of light diffracted by the diffraction grating.

Moreover, in a projection area of light corresponding to 0th-order light, in the case where a light intensity of light corresponding to high order diffracted light is smaller than a light intensity of light irradiated to an outside peripheral edge of the projection area, a plurality of light emitting optical systems including one light source and one diffraction grating may be included, a synthesis optical system for synthesizing light emitted from the respective light emitting optical systems may be included, the light sources in the respective light emitting optical systems may emit light of mutually different predetermined wavelengths, and the diffraction gratings in the respective light emitting optical systems may emit light from the light sources so that the light synthesized by the synthesis optical system has the light distribution pattern.

In this case, in the respective light emitting optical systems, light of a predetermined wavelength emitted from the light source is diffracted by the diffraction grating, and a light distribution pattern is formed. At this time, in the respective light emitting optical systems, since light diffracted by the diffraction grating has a predetermined wavelength such as described above, it is possible to suppress color bleeding from occurring near edges of a light distribution pattern in light emitted from the respective diffraction gratings, even if the diffraction grating has a wavelength dependency. In this way, light having a light distribution pattern in which color bleeding is suppressed is synthesized by a synthesis optical system, and a light distribution pattern is formed. Therefore, it is possible to suppress color bleeding from appearing near edges of a light distribution pattern formed by the vehicle illumination lamp of the present invention.

Moreover, in a projection area of light corresponding to 0th-order light, in the case where a light intensity of light corresponding to high order diffracted light is smaller than a light intensity of light irradiated to an outside peripheral edge of the projection area, components advancing and passing through the diffraction gratings in the respective light emitting optical systems may be synthesized by the synthesis optical system, and may be irradiated on the projection area. In this case, components advancing and passing through the respective diffraction gratings can be made a same color, even if the diffraction grating has a wavelength dependency such as described above. Therefore, it is possible to reduce a driver, pedestrian or the like from being unnecessarily aware of the projection area, and it becomes easier to operate.

Moreover, in a projection area of light corresponding to 0th-order light, in the case where a light intensity of light corresponding to high order diffracted light is smaller than a light intensity of light irradiated to an outside peripheral edge of the projection area, a plurality of light emitting optical systems including one light source and one diffraction grating may be included, the light sources in the respective light emitting optical systems may emit light of mutually different predetermined wavelengths, and the diffraction gratings in the respective light emitting optical systems may emit light from the light sources so as to have the light distribution pattern at a position separated a predetermined distance from a vehicle.

In this case, since the synthesis optical system is not used, it is possible to form a simple configuration.

Moreover, a vehicle headlight of the present invention includes at least two light emitting optical systems having a light source and a diffraction grating, in which the light sources in the respective light emitting optical systems emit light of mutually different predetermined wavelengths, and the diffraction gratings in the respective light emitting optical systems diffract light from the light sources so light in which the lights emitted from the respective light emitting optical systems are synthesized has a light distribution pattern for night illumination.

Since this vehicle headlight can form a light distribution pattern of a low beam without using a shade similar to the vehicle headlight described in Patent Document 1, it is possible to be reduced in size compared to a vehicle headlight using a shade similar to the vehicle headlight of Patent Document 1. In the respective light emitting optical systems, light of a predetermined wavelength emitted from the light source is diffracted by the diffraction grating, and a light distribution pattern is formed. At this time, in the respective light emitting optical systems, since light diffracted by the diffraction grating has a predetermined wavelength such as described above, it is possible to suppress color bleeding from occurring near edges of a light distribution pattern in light emitted from the respective diffraction gratings, even if the diffraction grating has a wavelength dependency. In this way, light having a light distribution pattern in which color bleeding is suppressed is synthesized, and a light distribution pattern for night illumination such as a low beam or a high beam is formed. Therefore, it is possible for a low beam irradiated by the vehicle headlight of the present invention to suppress color bleeding from appearing near edges of a light distribution pattern, compared to the case where white light is diffracted by a diffraction grating such as in Patent Document 1. Note that, the synthesis of the lights emitted from the respective light emitting optical systems may be performed inside the vehicle headlight or outside the vehicle headlight.

Moreover, in the case where including at least two light emitting optical systems having a light source and a diffraction grating, it is preferable for at least three light emitting optical systems to be included.

In this case, light of three primary colors can be used. Therefore, light of a desired color can be irradiated, by adjusting a light intensity of the lights emitted from the respective light emitting optical systems.

Further, in the case where including at least two light emitting optical systems having a light source and a diffraction grating, it is preferable to further include a synthesis optical system for combining and synthesizing external shapes of lights emitted from the respective light emitting optical systems, and in this case, the synthesis optical system may have at least one optical filter, and the optical filter may synthesize light passing through the optical filter and light reflecting the optical filter.

In this case, since the lights emitted from the respective light emitting optical systems are synthesized by the synthesis optical system and then emitted from the vehicle headlight, it is possible to further suppress color bleeding from appearing near edges of an irradiated light distribution pattern regardless of the distance from a vehicle. Moreover, since the lights emitted from the respective light emitting optical systems are synthesized by the synthesis optical system and then emitted from the vehicle headlight, the emission portion of the vehicle headlight where synthesized light is emitted can be made small, compared to the case where the lights emitted from the respective light emitting optical systems are emitted from the vehicle headlight without being synthesized, and synthesized outside the vehicle headlight, and the degree of freedom of the design can be improved.

BRIEF DESCRIPTION OF DRAWINGS

FIG. 20 is a figure showing, similar to FIG. 18, an optical system unit of a vehicle headlight according to a tenth embodiment of the present invention.

DESCRIPTION OF EMBODIMENTS

Hereinafter, aspects for implementing a vehicle illumination lamp and a vehicle headlight according to the present invention will be exemplified along with accompanying figures. The embodiments exemplified below are intended to facilitate understanding of the present invention, and are not intended to limit the present invention. The present invention can be modified and improved from the following embodiments, without departing from the spirit of the present invention.

First, a configuration of a vehicle illumination lamp of the present embodiment will be described.

First Embodiment

Figure 1:
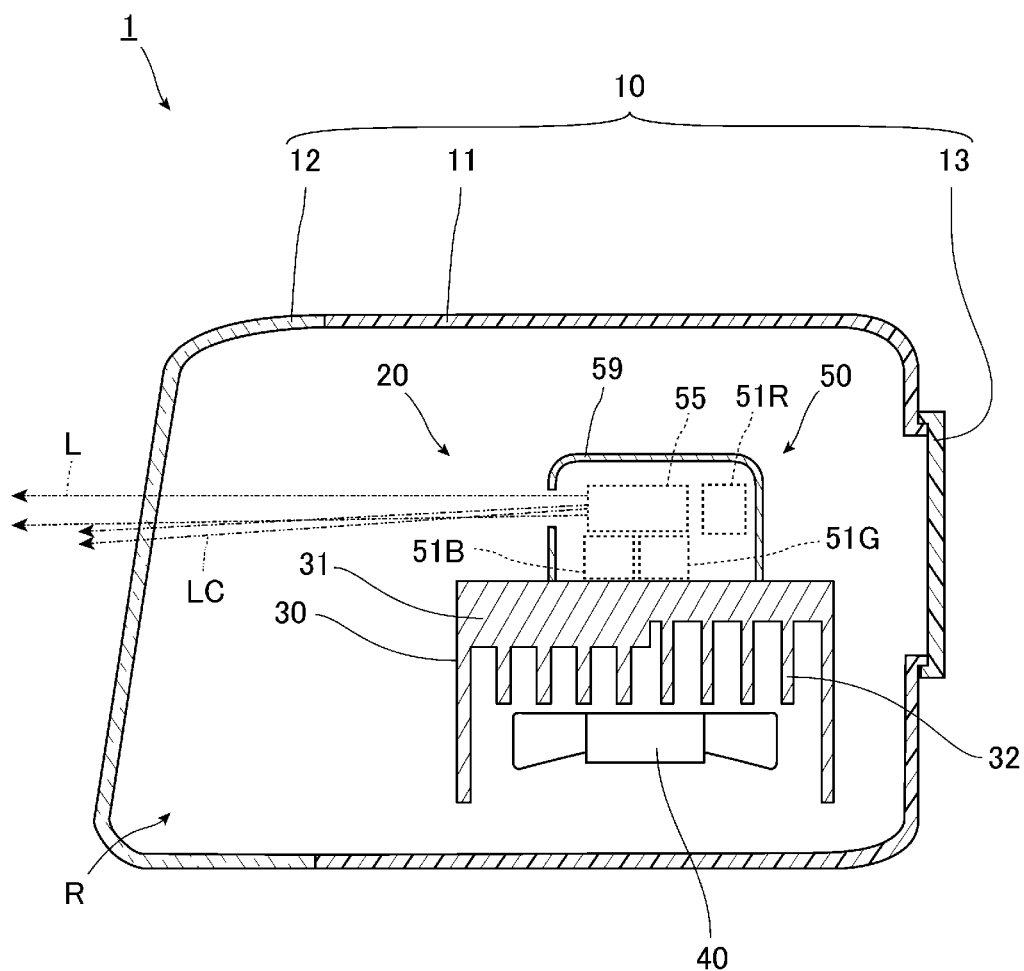
FIG. 1 is a cross-sectional view schematically showing a vehicle that includes a vehicle headlight according to a first embodiment of the present invention.

FIG. 1 is a cross-sectional view schematically showing a vehicle that includes a vehicle headlight according to the present embodiment. The vehicle headlight 1 of the present embodiment includes a housing 10, and a lamp unit 20.

The housing 10 includes a lamp housing 11, a front cover 12, and a back cover 13 as the main components. The front of the lamp housing 11 is open, and the front cover 12 is fixed to the lamp housing 11 so as to close this opening. An opening smaller than the front is formed behind the lamp housing 11, and the back cover 13 is fixed to the lamp housing 11 so as to close this opening.

A space formed by the lamp housing 11, the front cover 12 closing the opening in front of the lamp housing 11, and the back cover 13 closing the opening behind the lamp housing 11, is a lamp chamber R, and the lamp unit 20 is accommodated within this lamp chamber R.

The lamp unit 20 includes a heat sink 30, a cooling fan 40, and an optical system unit 50 as the main components. Note that, the lamp unit 20 is fixed to the housing 10 by a configuration that is not illustrated.

The heat sink 30 has a metal base plate 31 extending in a substantially horizontal direction, and a plurality of radiating fins 32 are integrally provided with the base plate 31 on a lower surface side of the base plate 31. The cooling fan 40 is disposed with a gap from the radiating fins 32, and is fixed to the heat sink 30. The heat sink 30 is cooled by airflow by rotation of the cooling fan 40.

The optical system unit 50 is disposed on an upper surface of the base plate 31 in the heat sink 30. The optical system unit 50 includes a first light emitting optical system 51R, a second light emitting optical system 51G, a third light emitting optical system 51B, a synthesis optical system 55, and a cover 59.

Figure 2:
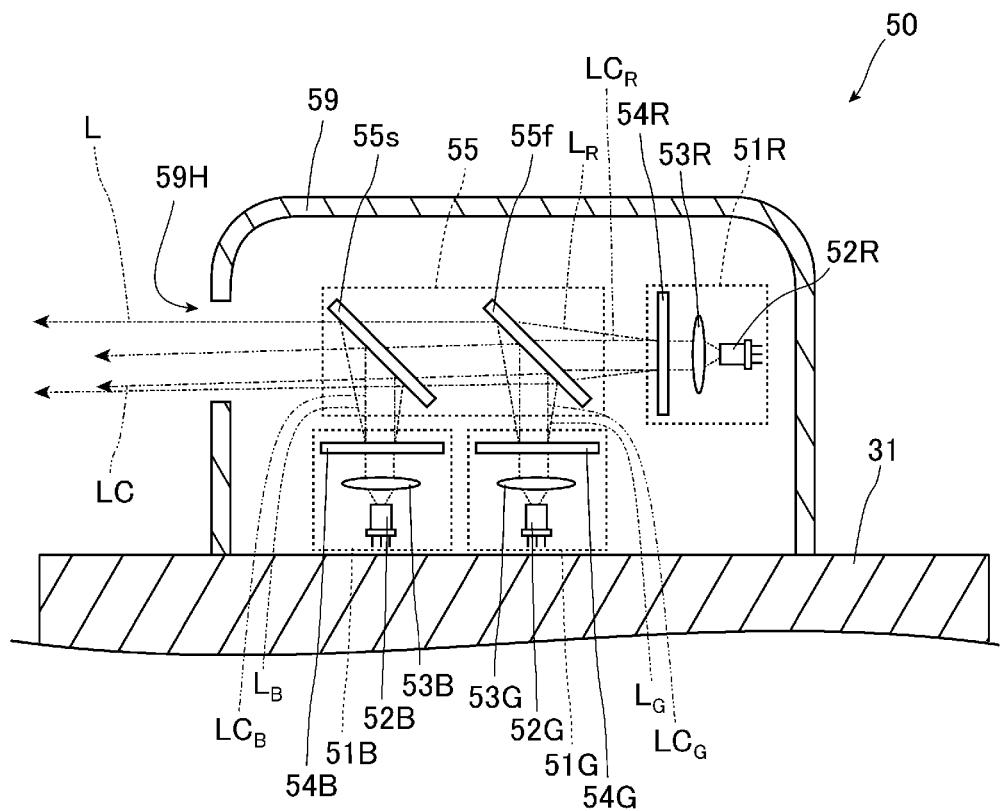
FIG. 2 is an enlarged view of an optical system unit of the vehicle headlight of FIG. 1.

FIG. 2 is an enlarged view of the optical system unit of the vehicle headlight shown in FIG. 1. As shown in FIG. 2, the first light emitting optical system 51R includes a light source 52R, a collimator lens 53R, and a diffraction grating 54R. The light source 52R is a laser element that emits laser light having a predetermined wavelength, and in the present embodiment, emits red laser light having a peak wavelength of power of, for example, 638 nm. The optical system unit 50 has a circuit board that is not illustrated, and the light source 52R is mounted on this circuit board. Power is supplied to the light source 52R through this circuit board.

The collimator lens 53R is a lens that collimates a fast axis direction and a slow axis direction of laser light emitted from the light source 52R. A collimator lens that collimates a fast axis direction and a collimator lens that collimates a slow axis direction of laser light may be separately provided.

The diffraction grating 54R emits laser light emitted from the collimator lens 53R so as to have a predetermined light distribution pattern. Specifically, the diffraction grating 54R, in the synthesis optical system 55 described later, diffracts laser light incident from the collimator lens 53R so that lights respectively emitted from the first light emitting optical system 51R, the second light emitting optical system 51G, and the third light emitting optical system 51B have a light distribution pattern of a low beam L. A light intensity distribution is also included in this light distribution pattern. Accordingly, the diffraction grating 54R of the present embodiment diffracts laser light incident from the collimator lens 53R, so as to have a light intensity distribution based on a light intensity distribution of a light distribution pattern of the low beam L, along with laser light emitted from the diffraction grating 54R having a same external shape as an external shape of a light distribution pattern of the low beam L.

This light diffracted by the diffraction grating 54R is high order diffracted light having an order of 1 or more, and in addition to this high order diffracted light, 0th-order light advancing and passing through the diffraction grating 54R without being diffracted is emitted from the diffraction grating 54R. Namely, light emitted from the diffraction grating 54R includes high order diffracted light that is a light component diffracted by the diffraction grating 54R, and 0th-order light that is a light component advancing and passing through the diffraction grating 54R. In the present embodiment, 0th-order light advancing and passing through the diffraction grating 54R is emitted from the diffraction grating 54R, so that a projection area of a 0th-order light beam LC emitted from the synthesis optical system 55 described later is positioned within a predetermined range below a light distribution pattern of the low beam L. For example, the diffraction grating 54R may diffract laser light incident from the collimator lens 53R, so that high order diffracted light is emitted in a state displaced above a direction of 0th-order light advancing through the diffraction grating 54R.

In this way, a red component of high order diffracted light among the low beam L, and a red component of 0th-order light among the 0th-order light beam LC are emitted from the first light emitting optical system 51R. In the present embodiment, a red component of high order diffracted light emitted from the first light emitting optical system 51R is set as first light $L_R$, and a red component of 0th-order light is set as first 0th-order light $LC_R$.

The second light emitting optical system 51G includes a light source 52G, a collimator lens 53G, and a diffraction grating 54G, and the third light emitting optical system 51B includes a light source 52B, a collimator lens 53B, and a diffraction grating 54B. The light sources 52G and 52B are respectively laser elements that emit laser light having a predetermined wavelength, and in the present embodiment, the light source 52G emits green laser light having a peak wavelength of power of, for example, 515 nm, and the light source 52B emits blue laser light having a peak wavelength of power of, for example, 445 nm. Moreover, the light sources 52G and 52B are respectively mounted on the circuit board, and power is supplied to the light sources 52G and 52B via this circuit board.

The collimator lens 53G is a lens that collimates a fast axis direction and a slow axis direction of laser light emitted from the light source 52G, and the collimator lens 53B is a lens that collimates a fast axis direction and a slow axis direction of laser light emitted from the light source 52B. In the collimator lenses 53G and 53B, a collimator lens that collimates a fast axis direction and a collimator lens that collimates a slow axis direction of laser light may be separately provided, similar to the collimator lens 53R.

The diffraction grating 54G emits laser light emitted from the collimator lens 53G so as to have a predetermined light distribution pattern, and the diffraction grating 54B emits laser light emitted from the collimator lens 53B so as to have a predetermined light distribution pattern. Specifically, the diffraction gratings 54G and 54B, in the synthesis optical system 55, respectively diffract laser light incident from the collimator lenses 53G and 53B so that lights respectively emitted from the first light emitting optical system 51R, the second light emitting optical system 51G, and the third light emitting optical system 51B have a light distribution pattern of the low beam L. A light intensity distribution is also included in the light distribution pattern, such as described above. Accordingly, the diffraction gratings 54G and 54B of the present embodiment respectively diffract laser light incident from the collimator lenses 53G and 53B, so as to have a light intensity distribution based on a light intensity distribution of a light distribution pattern of the low beam L, along with laser light respectively emitted from the diffraction gratings 54G and 54B having a same external shape as an external shape of a light distribution pattern of the low beam L.

The light diffracted by this diffraction grating 54G is high order diffracted light having an order of 1 or more, and in addition to this high order diffracted light, 0th-order light advancing and passing through the diffraction grating 54G without being diffracted is emitted from the diffraction grating 54G. Namely, light emitted from the diffraction grating 54G includes high order diffracted light that is a light component diffracted by the diffraction grating 54G, and 0th-order light that is a light component advancing and passing through the diffraction grating 54G. In the present embodiment, 0th-order light advancing and passing through the diffraction grating 54G is emitted from the diffraction grating 54G, so that a projection area of a 0th-order light beam LC emitted from the synthesis optical system 55 described later is positioned within a predetermined range below a light distribution pattern of the low beam L. For example, the diffraction grating 54G may diffract laser light incident from the collimator lens 53G, so that high order diffracted light is emitted in a state displaced above a direction of 0th-order light advancing through the diffraction grating 54G.

Similarly, this light diffracted by the diffraction grating 54B is high order diffracted light having an order of 1 or more, and in addition to this high order diffracted light, 0th-order light advancing and passing through the diffraction grating 54B without being diffracted is emitted from the diffraction grating 54B. Namely, light emitted from the diffraction grating 54B includes high order diffracted light that is a light component diffracted by the diffraction grating 54G, and 0th-order light that is a light component advancing and passing through the diffraction grating 54B. In the present embodiment, 0th-order light advancing and passing through the diffraction grating 54B is emitted from the diffraction grating 54B, so that a projection area of a 0th-order light beam LC emitted from the synthesis optical system 55 described later is positioned within a predetermined range below a light distribution pattern of the low beam L. For example, the diffraction grating 54B may diffract laser light incident from the collimator lens 53B, so that high order diffracted light is emitted in a state displaced above a direction of 0th-order light advancing through the diffraction grating 54B.

In this way, a green component of high order diffracted light among the low beam L, and a green component of 0th-order light among the 0th-order light beam LC are emitted from the second light emitting optical system 51G. Moreover, a blue component of high order diffracted light among the low beam L, and a blue component of 0th-order light among the 0th-order light beam LC are emitted from the third light emitting optical system 51B. In the present embodiment, a green component of high order diffracted light emitted from the second light emitting optical system 51G is set as second light $L_G$, a green component of 0th-order light is set as second 0th-order light $LC_G$, a blue component of high order diffracted light emitted from the third light emitting optical system 51B is set as third light $L_B$, and a blue component of 0th-order light is set as third 0th-order light $LC_B$. Therefore, in the present embodiment, the first light $L_R$ has a longest wavelength, and the wavelength becomes shorter in the order of the second light $L_G$ and the third light $L_B$. Similarly, the first 0th-order light $LC_R$ has a longest wavelength, and the wavelength becomes shorter in the order of the second 0th-order light $LC_G$ and the third 0th-order light $LC_B$.

Note that, a light intensity distribution based on a light intensity distribution of a light distribution pattern of the low beam L means that the light intensities of lights respectively emitted from the diffraction gratings 54R, 54G, and 54B are high, at a portion where a light intensity in a light distribution pattern of the low beam L is high.

The synthesis optical system 55 includes a first optical element 55f and a second optical element 55s. The first optical element 55f is an optical element that synthesizes the first light $L_R$ emitted from the first light emitting optical system 51R and the second light $L_G$ emitted from the second light emitting optical system 51G. Moreover, the first optical element 55f is also an optical element that synthesizes the first 0th-order light $LC_R$ emitted from the first light emitting optical system 51R and the second 0th-order light $LC_G$ emitted from the second light emitting optical system 51G. In the present embodiment, the first optical element 55f synthesizes the first light $L_R$ and the second light $L_G$ by transmitting the first light $L_R$ and reflecting the second light $L_G$, and synthesizes the first 0th-order light $LC_R$ and the second 0th-order light $LC_G$ by transmitting the first 0th-order light $LC_R$ and reflecting the second 0th-order light $LC_G$.

The second optical element 55s is an optical element that synthesizes the first light $L_R$ and the second light $L_G$ synthesized by the first optical element 55f and the third light $L_B$ emitted from the third light emitting optical system 51B. Moreover, the second optical element 55s is also an optical element that synthesizes the first 0th-order light $LC_R$ and the second 0th-order light $LC_G$ synthesized by the first optical element 55f and the third 0th-order light $LC_B$ emitted from the third light emitting optical system 51B. In the present embodiment, the second optical element 55s synthesizes the first light $L_R$, the second light $L_G$, and the third light $L_B$ by transmitting the first light $L_R$ and the second light $L_G$ synthesized by the first optical element 55f and reflecting the third light $L_B$. Moreover, the second optical element 55s synthesizes the first 0th-order light $LC_R$, the second 0th-order light $LC_G$, and the third 0th-order light $LC_B$ by transmitting the first 0th-order light $LC_R$ and the second 0th-order light $LC_G$ synthesized by the first optical element 55f and reflecting the third 0th-order light $LC_B$.

An optical filter, in which an oxide film is layered on a glass substrate, can be included as such a first optical element 55f and second optical element 55s. By controlling the type and thickness of this oxide film, it is possible to form a configuration that transmits light having a wavelength longer than a predetermined wavelength, and reflects light having a wavelength shorter than this wavelength.

In this way, the low beam L is emitted, by having the first light $L_R$, the second light $L_G$, and the third light $L_B$ synthesized, and the 0th-order light beam LC is emitted, by having the first 0th-order light $LC_R$, the second 0th-order light $LC_G$, and the third 0th-order light $LC_B$ synthesized, from the synthesis optical system 55.

The cover 59 is fixed on the base plate 31 of the heat sink 30. The cover 59 has a substantially rectangular shape, and is made, for example, of a metal such as aluminum. The first light emitting optical system 51R, the second light emitting optical system 51G, the third light emitting optical system 51B, and the synthesis optical system 55 are disposed in a space inside the cover 59. Moreover, an opening 59H through which light emitted from the synthesis optical system 55 can be transmitted is formed in front of the cover 59. Note that, it is preferable for an inner wall of the cover 59 to have a light absorptance by black alumite processing or the like. By making an inner wall of the cover 59 have a light absorptance, it is possible to suppress light irradiated on the inner wall of the cover 59 from being reflected and emitted in an unintended direction from the opening 59H, due to unintended reflection or refraction or the like.

Next, the emission of light by the vehicle headlight 1 of the present embodiment will be described.

First, by supplying power from a power source that is not illustrated, laser light is emitted from the respective light sources 52R, 52G, and 52B. As described above, red laser light is emitted from the light source 52R, green laser light is emitted from the light source 52G, and blue laser light is emitted from the light source 52B. The respective laser lights are collimated by collimator lenses 53R, 53G, and 53B, and afterwards are incident on the diffraction gratings 54R, 54G, and 54B. Then, as described above, the respective laser lights are diffracted by the diffraction gratings 54R, 54G, and 54B, the first light $L_R$ that is a red component of light of a light distribution pattern of the low beam L is emitted from the first light emitting optical system 51R, the second light $L_G$ that is a green component of light of a light distribution pattern of the low beam L is emitted from the second light emitting optical system 51G, and the third light $L_B$ that is a blue component of light of a light distribution pattern of the low beam L is emitted from the third light emitting optical system 51B. Moreover, as described above, the first 0th-order light $LC_R$ that is a red component of 0th-order light is emitted from the first light emitting optical system 51R, the second 0th-order light $LC_G$ that is a green component of 0th-order light is emitted from the second light emitting optical system 51G, and the third 0th-order light $LC_B$ that is a blue component of the 0th-order light is emitted from the third light emitting optical system 51B, as 0th-order lights advancing and passing through the diffraction gratings 54R, 54G, and 54B.

In the synthesis optical system 55, first, the first light $L_R$ and the second light $L_G$ are synthesized and emitted by the first optical element 55f, and the first 0th-order light $LC_R$ and the second 0th-order light $LC_G$ are synthesized and emitted by the first optical element 55f. The first light $L_R$ and the second light $L_G$ synthesized by the first optical element 55f are synthesized with the third light $L_B$ by the second optical element 55s, and the first 0th-order light $LC_R$ and the second 0th-order light $LC_G$ synthesized by the first optical element 55f are synthesized with the third 0th-order light $LC_B$ by the second optical element 55s. At this time, since the respective lights $L_R$, $L_G$, and $L_B$ have an external shape the same as the external shape of the low beam L, the external shapes of the respective lights $L_R$, $L_G$, and $L_B$ will be synthesized by matching each other. In addition, since the external shapes of the respective 0th-order lights $LC_R$, $LC_G$, and $LC_B$ are also the same, the external shapes of the respective 0th-order lights $LC_R$, $LC_G$, and $LC_B$ will be synthesized by matching each other. Namely, the positions of each of the light emitting optical systems and the synthesis optical system are finely adjusted, so that the external shape of the first light $L_R$, the external shape of the second light $L_G$, and the external shape of the third light $L_B$, and also the external shape of the first 0th-order light $LC_R$, the external shape of the second 0th-order light $LC_G$, and the external shape of the third 0th-order light $LC_B$, are combined by the synthesis optical system such as described above.

In this way, light in which the red first light $L_R$, the green second light $L_G$, and the blue third light $L_B$ are synthesized becomes white light. Moreover, light in which the red first 0th-order light $LC_R$, the green second 0th-order light $LC_G$, and the blue third 0th-order light $LC_B$ are synthesized becomes white 0th-order light. Note that, since the first light $L_R$, the second light $L_G$, and the third light $L_B$ are light intensity distributions based on a light intensity distribution of a light distribution pattern of the low beam L such as described above, white light in which these lights are synthesized will become a light intensity distribution of the low beam L.

In this way, synthesized white light is emitted from the opening 59H of the cover 59, and this light is emitted from the vehicle headlight 1 to the front of the vehicle via the front cover 12. Since this light has a light distribution pattern of the low beam L, the irradiated light becomes the low beam L.

Figure 3:
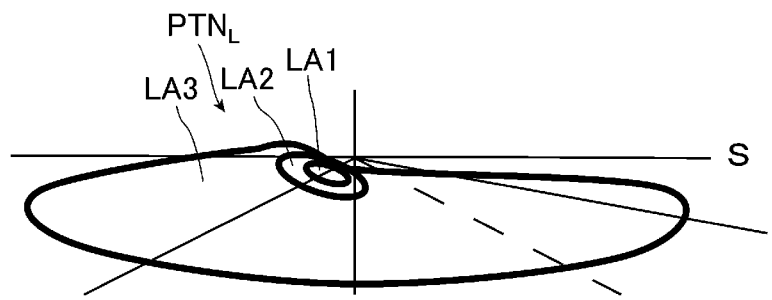
FIG. 3 is a figure showing a light distribution pattern of a low beam.

FIG. 3 is a figure showing a light distribution pattern of the low beam L in the present embodiment. In FIG. 3, S shows a horizontal line, and a light distribution pattern is shown by a bold line. Among a light distribution pattern $PTN_L$ of this low beam L, an area LA1 is an area having a highest light intensity, and the light intensity decreases in the order of an area LA2 and an area LA3. Namely, the respective diffraction gratings 54R, 54G, and 54B diffract light so that synthesized light forms a light distribution pattern including a light intensity distribution of the low beam L.

Further, synthesized white 0th-order light is emitted from the opening 59H of the cover 59, this light is emitted from the vehicle headlight 1 to the front lower side of the vehicle via the front cover 12, and is projected to a projection area on a lower side of a light distribution pattern of the low beam L.

Figure 4:
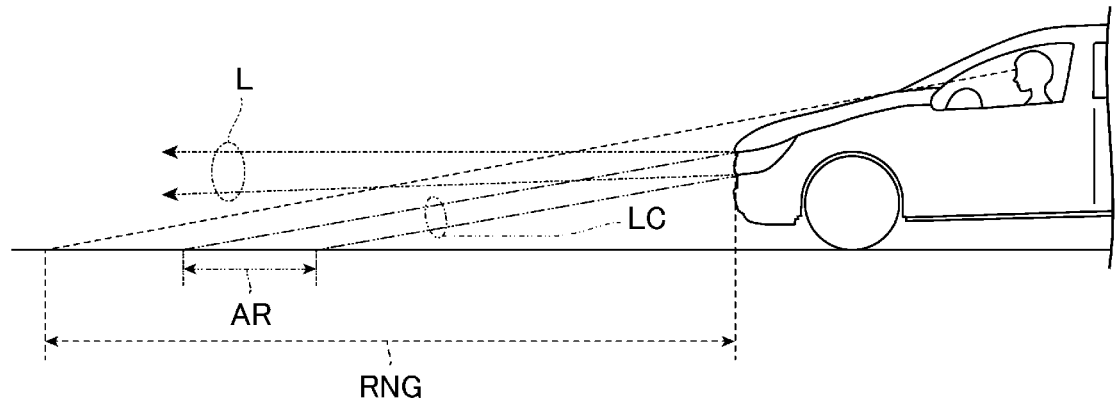
FIG. 4 is a figure showing a projection area of 0th-order light.

FIG. 4 is a diagram showing a projection area of 0th-order light. As shown in FIG. 4, a projection area AR of the present embodiment is positioned within a range RNG in which a field of view of a driver of an automobile is obstructed by the hood of the vehicle. Namely, the projection area AR is positioned within a range RNG that is a blind spot of a driver of an automobile. Note that, road surface illuminance in an area other than the projection area AR of 0th-order light, among the range RNG that is a blind spot of a driver of an automobile, is approximately 5 lx or less.

Incidentally, the hologram element of the vehicle headlight in Patent Document 1 is calculated, so that 1st-order light for forming a light distribution pattern of a low beam is irradiated in front of the vehicle, and 0th-order light is irradiated toward the front other than the light distribution pattern of this low beam light. Accordingly, in the vehicle headlight in Patent Document 1, the possibility of 0th-order light causing glare can be prevented. 0th-order light tends to have a high light intensity compared to a light intensity of high order diffracted light having an order of 1 or more. However, in the vehicle headlight described in Patent Document 1, while the 0th-order light emitted from the hologram element is light other than a light distribution pattern of the low beam, the 0th-order light is emitted toward the front of the vehicle. For this reason, there is a demand to have an easier operation.

Accordingly, the vehicle headlight 1 of the present embodiment includes light sources 52R, 52G, and 52B, and diffraction gratings 54R, 54G, and 54B that diffract light incident from the light sources 52R, 52G, and 52B.

The projection area AR, on which is projected 0th-order light that is a component advancing and passing through the diffraction gratings 54R, 54G, and 54B from among light incident on the diffraction gratings 54R, 54G, and 54B, is lower than a light distribution pattern diffracted and irradiated by the diffraction gratings 54R, 54G, and 54B. In addition to this, the projection area AR is positioned within a range RNG in which a field of view of a driver of an automobile is obstructed by the automobile.

Therefore, the vehicle headlight 1 of the present embodiment can suppress a reduction in a driver's ability to pay attention due to the 0th-order light having a high light intensity compared to a light intensity of high order light from 1st-order light onwards. Accordingly, the vehicle headlight 1 of the present embodiment can be easily operated, compared to the case where 0th-order light is in a field of view of a driver of an automobile.

Note that, light diffracted by the diffraction gratings 54R, 54G, and 54B, in the present embodiment, is irradiated in a light distribution pattern of the low beam L. Since the light distribution pattern $PTN_L$ of the low beam L has a light intensity distribution in which a central portion of the light distribution pattern $PTN_L$ is bright and peripheral portions other than the central portion are relatively dark, such as shown in FIG. 3, a natural light distribution pattern can be irradiated that does not provide a driver with a sense of discomfort.

Therefore, since the vehicle headlight 1 of the present embodiment can form the light distribution pattern $PTN_L$ of the low beam L without using a shade, it is possible to reduce in size compared to a vehicle headlight using a shade.

Moreover, the vehicle headlight 1 of the present embodiment has a plurality of light emitting optical systems including one light source and one diffraction grating. Namely, the vehicle headlight 1 has a first light emitting optical system 51R including one light source 52R and one diffraction grating 54R, a second light emitting optical system 51G including one light source 52G and one diffraction grating 54G, and a third light emitting optical system 51B including one light source 52B and one diffraction grating 54B. In addition to this, the vehicle headlight 1 of the present embodiment further includes a synthesis optical system 55 that synthesizes lights emitted from the respective light emitting optical systems 51R, 51G, and 51B. Also, the respective light sources 52R, 52G, and 52B emit light of mutually different predetermined wavelengths, and the respective diffraction gratings 54R, 54G, and 54B diffract light from the light sources 52R, 52G, and 52B so that light synthesized by the synthesis optical system 55 has the light distribution pattern $PTN_L$ of the low beam L.

In this case, light having a predetermined wavelength emitted from the respective light sources 52R, 52G, and 52B is diffracted by the diffraction gratings 54R, 54G, and 54B, and the light distribution pattern $PTN_L$ is formed. At this time, in the respective light emitting optical systems 51R, 51G, and 51B, since light diffracted by the diffraction gratings 54R, 54G, and 54B has a predetermined wavelength, it is possible to suppress color bleeding from occurring near edges of the light distribution pattern $PTN_L$ in the lights emitted from the respective diffraction gratings 54R, 54G, and 54B, even if the diffraction gratings 54R, 54G, and 54B have a wavelength dependency. In this way, light having a light distribution pattern in which color bleeding is suppressed is synthesized by the synthesis optical system 55, and the light distribution pattern $PTN_L$ of the low beam L is formed. Therefore, the low beam L irradiated by the vehicle headlight 1 of the present embodiment can suppress color bleeding from appearing near edges of the light distribution pattern $PTN_L$.

Moreover, in the vehicle headlight 1 of the present embodiment, the 0th-order lights $LC_R$, $LC_G$, and $LC_B$ advancing and passing through the respective diffraction gratings 54R, 54G, and 54B are synthesized by the synthesis optical system 55, and projected to the projection area AR. In this case, even if the diffraction gratings 54R, 54G, and 54B have a wavelength dependency such as described above, the 0th-order lights $LC_R$, $LC_G$, and $LC_B$ passing through the respective diffraction gratings 54R, 54G, and 54B can be made a same white color. Therefore, in the vehicle headlight 1 of the present embodiment, it is possible to reduce pedestrians or the like outside a vehicle from being unnecessarily aware of the projection area AR.

Second Embodiment

Next, a second embodiment of the present invention will be described in detail with reference to FIG. 5. Note that, overlapping descriptions attached with the same reference numerals, except for particular descriptions, will be omitted for constituent elements the same or equivalent to those of the first embodiment.

Figure 5:
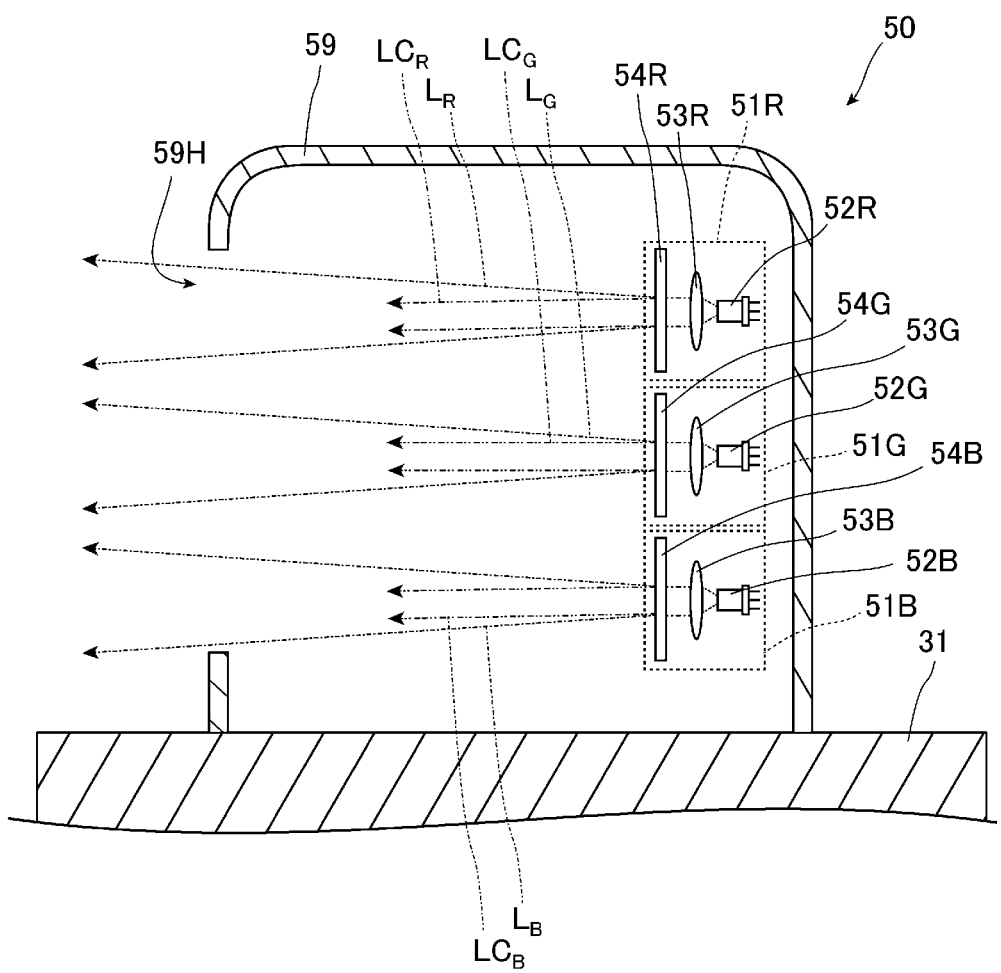
FIG. 5 is a figure showing, similar to FIG. 2, an optical system unit of a vehicle headlight according to a second embodiment of the present invention.

FIG. 5 is a figure showing, similar to FIG. 2, an optical system unit of a vehicle headlight according to the present embodiment. As shown in FIG. 5, the optical system unit 50 of the vehicle headlight of the present embodiment is different to the optical system unit 50 of the first embodiment for the point of not including the synthesis optical system 55, and emitting the respective lights emitted from the first light emitting optical system 51R, the second light emitting optical system 51G, and the third light emitting optical system 51B from the cover 59, in a state where not synthesized. In the present embodiment, the first light emitting optical system 51R, the second light emitting optical system 51G, and the third light emitting optical system 51B have an irradiation direction of light on an opening 59H side of the cover 59.

In the present embodiment, similar to the first embodiment, in the diffraction grating 54R of the first light emitting optical system 51R, the diffraction grating 54G of the second light emitting optical system 51G, and the diffraction grating 54B of the third light emitting optical system 51B, respectively, light is emitted so that synthesized light forms a light distribution pattern of the low beam L.

Namely, the first light $L_R$ emitted from the diffraction grating 54R, the second light $L_G$ emitted from the diffraction grating 54G, and the third light $L_B$ emitted from the diffraction grating 54B are respectively emitted from the opening 59H of the cover 59, and irradiated to the outside of the vehicle headlight via the front cover 12. Moreover, the first 0th-order light $LC_R$ emitted from the diffraction grating 54R, the second 0th-order light $LC_G$ emitted from the diffraction grating 54G, and the third 0th-order light $LC_B$ emitted from the diffraction grating 54B are respectively emitted from the opening 59H of the cover 59, and irradiated to the outside of the vehicle headlight via the front cover 12. At this time, the first light $L_R$, the second light $L_G$, and the third light $L_B$ are irradiated so that the external shapes of the respective light distribution patterns substantially match each other at a focal position separated a predetermined distance from the vehicle. This distance from the vehicle is, for example, 25 m. Also, the first 0th-order light $LC_R$, the second 0th-order light $LC_G$, and the third 0th-order light $LC_B$ are irradiated so that the external shapes of the respective light distribution patterns substantially match each other within the range RNG that is a blind spot of a driver of an automobile. Namely, in the present embodiment, the irradiation directions of light of the first light emitting optical system 51R, the second light emitting optical system 51G, and the third light emitting optical system 51B are finely adjusted, so that the external shapes match each other such as described above.

According to the vehicle headlight of the present embodiment, since the synthesis optical system 55 of the first embodiment is not used, it is possible to form a simple configuration. Moreover, according to the vehicle headlight 1 of the present embodiment, similar to the first embodiment, since 0th-order light having a high light intensity compared to a light intensity of high order light from 1st-order light onwards is irradiated within the range RNG that is a blind spot of a driver of an automobile, it is possible to suppress a reduction in a driver's ability to pay attention. Note that, the external shape of the first light $L_R$, the external shape of the second light $L_G$, and the external shape of the third light $L_B$, and also the external shape of the first 0th-order light $LC_R$, the external shape of the second 0th-order light $LC_G$, and the external shape of the third 0th-order light $LC_B$, of the present embodiment tend to slightly deviate from each other except for at the focal position. However, when compared with light obtained by having white light incident on one diffraction grating, it is possible to suppress this deviation of the external shapes. Therefore, according to the present embodiment, a vehicle headlight can be realized that is capable of suppressing color bleeding while being reduced in size.

Note that, in the first and second embodiments, there is included the first light emitting optical system that emits a red component of the first light $L_R$, the second light emitting optical system that emits a green component of the second light $L_G$, and the third light emitting optical system that emits a blue component of the third light $L_B$. However, in the first and second embodiments, the lights emitted from the light sources respectively included in the three light emitting optical systems are not limited to red, green, and blue, as long as they have respectively different predetermined wavelengths.

Moreover, the number of light emitting optical systems may be one or two. In addition, the number of light emitting optical systems may be three or more. In this case, for example, a fourth light emitting optical system that emits a yellow component of light of the low beam L may be provided. In this case, in addition to the red, green, and blue light emitting optical systems, the fourth light emitting optical system may emit a yellow component of light of the low beam L. Moreover, in the case where a light intensity of a part of red, green, and blue is low, the fourth light emitting optical system may emit a color component of light the same as the color with a low light intensity.

Moreover, in the first and second embodiments, a white balance adjustment circuit may be further provided. This white balance adjustment circuit can achieve a desired white balance, by controlling a total light flux amount of light emitted from the light source 52R of the first light emitting optical system 51R, a total light flux amount of light emitted from the light source 52G of the second light emitting optical system 51G, and a total light flux amount of light emitted from the light source 52B of the third light emitting optical system 51B. For example, it may be possible to perform switching, so as to emit warm white light or to emit blue white light, within the scope of the law.

Moreover, in the first embodiment, the first optical element 55f synthesizes the first light $L_R$ and the second light $L_G$ by transmitting the first light $L_R$ first light and reflecting the second light $L_G$, and the second optical element 55s synthesizes the first light $L_R$, the second light $L_G$, and the third light $L_B$ by transmitting the first light $L_R$ and the second light $L_G$ synthesized by the first optical element 55f and reflecting the third light $L_B$. However, for example, it may have a configuration where the third light $L_B$ and the second light $L_G$ are synthesized in the first optical element 55f, and the third light $L_B$ and the second light $L_G$ synthesized by the first optical element 55f and the first light $L_R$ are synthesized in the second optical element 55s. In this case, the positions of the first light emitting optical system 51R and the third light emitting optical system 51B of the first embodiment are switched. Moreover, in this case, it will have a configuration where the third 0th-order light $LC_B$ and the second 0th-order light $LC_G$ are synthesized in the first optical element 55f, and the third 0th-order light $LC_B$ and the second 0th-order light $LC_G$ synthesized by the first optical element 55f and the first 0th-order light $LC_R$ are synthesized in the second optical element 55s. Moreover, in the first embodiment, a band pass filter that transmits light of a predetermined wavelength band and reflects light of other wavelength bands may be used in the first optical element 55f or the second optical element 55s. The synthesis optical system 55 may combine and synthesize external shapes of lights emitted from the respective light emitting optical systems, and is not limited to the first embodiment.

Moreover, in the first embodiment, the 0th-order lights $LC_R$, $LC_G$, and $LC_B$ advancing and passing through the respective diffraction gratings 54R, 54G, and 54B are synthesized by the synthesis optical system 55, and projected to the projection area AR. However, the 0th-order lights $LC_R$, $LC_G$, and $LC_B$ may not be synthesized by the synthesis optical system 55, and may be projected to different areas within the range RNG that is a blind spot of a driver of an automobile. However, as described above, in the case where reducing pedestrians or the like outside a vehicle from being unnecessarily aware of the projection area AR, it is preferable that the 0th-order lights $LC_R$, $LC_G$, and $LC_B$ advancing and passing through the respective diffraction gratings 54R, 54G, and 54B are synthesized by the synthesis optical system 55, and projected to the projection area AR.

In the first and second embodiments, a light distribution pattern of the low beam L is formed as a light distribution pattern for dark place illumination. However, it is not limited to a light distribution pattern of the low beam L, if it is a light distribution pattern for dark place illumination. Note that, a light distribution pattern for dark place illumination is used at night or in dark places such as tunnels. For example, there are cases where a light distribution pattern of the low beam L, and a light distribution pattern of light for visually recognizing a sign positioned outside, for example, above this light distribution pattern, are formed as a light distribution pattern for dark place illumination. In this case, it is preferable that light for visually recognizing a sign is included in high order diffracted light diffracted by the respective diffraction gratings 54R, 54G, and 54B. Moreover, for example, a light distribution pattern of a high beam may be formed as a light distribution pattern for dark place illumination.

Moreover, in the first and second embodiments, a headlight of an automobile is exemplified as the vehicle headlight 1. However, the first and second embodiments are not limited to a headlight of an automobile, and may be used as a headlight of another vehicle. The first and second embodiments are not limited to a headlight, and may be a lamp such as a rear light, a tail light, a brake light, or an indicator light.

That is, the present invention exemplified in the first and second embodiments may be a vehicle illumination lamp such as follows. Namely, the vehicle illumination lamp includes a light source, and a diffraction grating that diffracts light incident from the light source. The light diffracted by this diffraction grating is irradiated in a predetermined light distribution pattern, and a projection area to which are projected components advancing and passing through the diffraction grating among the light incident on the diffraction grating is positioned below the light distribution pattern and within a range in which a field of view of a driver of a vehicle is obstructed by the vehicle. It can be easily operated, if such a vehicle illumination lamp.

Third Embodiment

Figure 6:
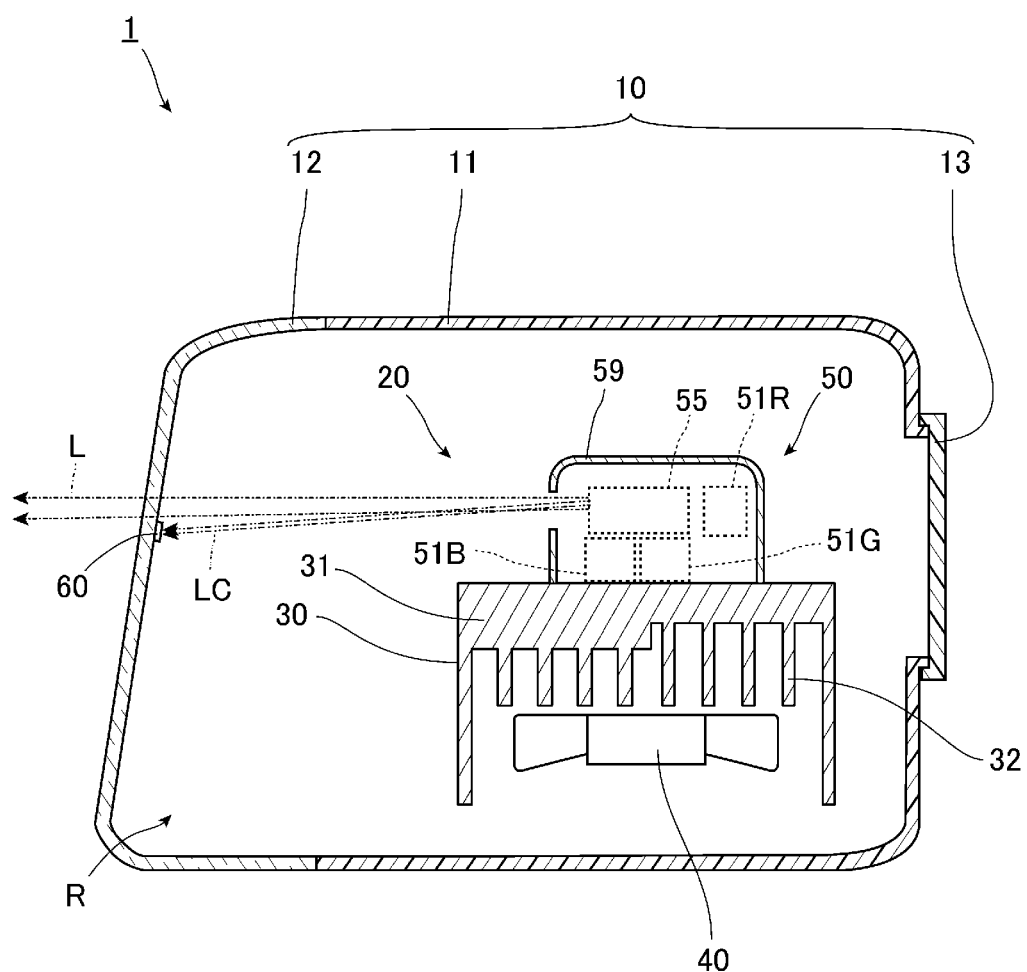
FIG. 6 is a cross-sectional view schematically showing a vehicle that includes a vehicle headlight according to a third embodiment of the present invention.

Next, a third embodiment of the present invention will be described. Note that, overlapping descriptions attached with the same reference numerals, except for particular descriptions, will be omitted for constituent elements the same or equivalent to those of the first embodiment. FIG. 6 is a cross-sectional view schematically showing a vehicle that includes a vehicle headlight according to the present embodiment. As shown in FIG. 6, the vehicle headlight 1 in the present embodiment is different for the point that an optical element 60 is included.

The optical system unit 50 of the present embodiment includes a first light emitting optical system 51R, a second light emitting optical system 51G, a third light emitting optical system 51B, a synthesis optical system 55, a cover 59, and an optical element 60.

The optical element 60 is an optical element that lowers an energy density of light. A light shielding element or a light diffusing element can be provided, for example, as the optical element 60. An example that applies a black anodization process to a metal plate such as aluminum, or an example that molds a substrate and a light shielding material such as carbon black can be provided as a specific example of a light shielding element. A lens, sheet or the like that diffuses or scatters light can be provided as a specific example of a light diffusing element.

Such an optical element 60 is disposed on an optical path of a 0th-order light beam LC between a projection area of the 0th-order light beam LC and diffraction gratings 54R, 54G, and 54B. The optical element 60 of the present embodiment is disposed within a housing 10. In the example shown in FIG. 6, the optical element 60 is disposed on the surface of a front cover 12 on a lamp chamber R side, and the distance of an optical path between the optical element 60 and the diffraction grating 54B closest to the optical element 60 is set as, for example, 100 mm.

Next, the emission of light by the vehicle headlight 1 of the present embodiment will be described.

Similar to the first embodiment, first, by supplying power from a power source that is not illustrated, laser light is emitted from the respective light sources 52R, 52G, and 52B. As described above, red laser light is emitted from the light source 52R, green laser light is emitted from the light source 52G, and blue laser light is emitted from the light source 52B. The respective laser lights are collimated by collimator lenses 53R, 53G, and 53B, and afterwards are incident on the diffraction gratings 54R, 54G, and 54B. Then, as described above, the respective laser lights are diffracted by the diffraction gratings 54R, 54G, and 54B, the first light $L_R$ that is a red component of light of a light distribution pattern of the low beam L is emitted from the first light emitting optical system 51R, the second light $L_G$ that is a green component of light of a light distribution pattern of the low beam L is emitted from the second light emitting optical system 51G, and the third light $L_B$ that is a blue component of light of a light distribution pattern of the low beam L is emitted from the third light emitting optical system 51B. Moreover, as described above, the first 0th-order light $LC_R$ that is a red component of 0th-order light is emitted from the first light emitting optical system 51R, the second 0th-order light $LC_G$ that is a green component of 0th-order light is emitted from the second light emitting optical system 51G, and the third 0th-order light $LC_B$ that is a blue component of the 0th-order light is emitted from the third light emitting optical system 51B, as 0th-order lights advancing and passing through the diffraction gratings 54R, 54G, and 54B.

In the synthesis optical system 55, first, the first light $L_R$ and the second light $L_G$ are synthesized and emitted by the first optical element 55f, and the first 0th-order light $LC_R$ and the second 0th-order light $LC_G$ are synthesized and emitted by the first optical element 55f. The first light $L_R$ and the second light $L_G$ synthesized by the first optical element 55f are synthesized with the third light $L_B$ by the second optical element 55s, and the first 0th-order light $LC_R$ and the second 0th-order light $LC_G$ synthesized by the first optical element 55f are synthesized with the third 0th-order light $LC_B$ by the second optical element 55s. At this time, since the respective lights $L_R$, $L_G$, and $L_B$ have an external shape the same as the external shape of the low beam L, the external shapes of the respective lights $L_R$, $L_G$, and $L_B$ will be synthesized by matching each other. In addition, since the external shapes of the respective 0th-order lights $LC_R$, $LC_G$, and $LC_B$ are also the same, the external shapes of the respective 0th-order lights $LC_R$, $LC_G$, and $LC_B$ will be synthesized by matching each other. Namely, the positions of each of the light emitting optical systems and the synthesis optical system are finely adjusted, so that the external shape of the first light $L_R$, the external shape of the second light $L_G$, and the external shape of the third light $L_B$, and also the external shape of the first 0th-order light $LC_R$, the external shape of the second 0th-order light $LC_G$, and the external shape of the third 0th-order light $LC_B$, are combined by the synthesis optical system such as described above.

In this way, light in which the red first light $L_R$, the green second light $L_G$, and the blue third light $L_B$ are synthesized becomes white, and this white light is emitted from the synthesis optical system 55 as the low beam L. Moreover, light in which the red first 0th-order light $LC_R$, the green second 0th-order light $LC_G$, and the blue third 0th-order light $LC_B$ are synthesized becomes white, and this white light is emitted from the synthesis optical system 55 as the 0th-order light beam LC.

The 0th-order light beam LC emitted from the synthesis optical system 55 is emitted from the opening 59H of the cover 59, is irradiated on the optical element 60 attached to the surface of the front cover 12 on the lamp chamber R side, and an energy density of the 0th-order light beam LC is lowered by this optical element 60.

The low beam L emitted from the synthesis optical system 55 is emitted from the opening 59H of the cover 59, emitted from the vehicle headlight 1 to the front of the vehicle via the front cover 12, and irradiated in a predetermined light distribution pattern. In the present embodiment, irradiation is performed in the light distribution pattern $PTN_L$ of the low beam L shown in FIG. 3.

As described above, the vehicle headlight 1 of the present embodiment includes the light sources 52R, 52G, and 52B, and the diffraction gratings 54R, 54G, and 54B that diffract lights incident from the light sources 52R, 52G, and 52B. High order diffracted light diffracted by the diffraction gratings 54R, 54G, and 54B, among the lights emitted from the diffraction gratings 54R, 54G, 54B, is irradiated in the light distribution pattern $PTN_L$ of the low beam L.

In addition to this, the vehicle headlight 1 of the present embodiment includes the optical element 60. This optical element 60 is disposed on an optical path of the 0th-order light beam LC between the projection area of the 0th-order light beam LC and the diffraction gratings 54R, 54G, and 54B, and lowers an energy density of the 0th-order light beam LC.

Therefore, in the vehicle headlight 1 of the present embodiment, even if a light intensity of 0th-order light is higher than a light intensity of high order diffracted light, among lights emitted from the diffraction gratings 54R, 54G, and 54B, an energy density of this 0th-order light can be lowered by the optical element 60. Accordingly, it is possible to suppress the projection area of 0th-order light from becoming noticeably brighter than the light distribution pattern $PTN_L$ by high order diffracted light among lights emitted from the diffraction gratings 54R, 54G, and 54B. In this way, the vehicle headlight 1 of the present embodiment can be easily operated compared to the case where not including the optical element 60.

In the present embodiment, the optical element 60 is disposed within the housing 10 such as described above. Accordingly, there will be a reduction of 0th-order light being emitted outside the vehicle. Therefore, it is possible to suppress the projection area of the 0th-order light beam LC from becoming noticeably bright outside the vehicle, and as a result of this, it is possible to suppress a driver, pedestrian or the like from being unnecessarily aware of the projection area.

Moreover, in the present embodiment, the optical element 60 may be a light shielding element or a light diffusing element such as described above. Accordingly, in the vehicle headlight 1 of the present embodiment, a light shielding element or a light diffusing element can be selected as the optical element 60, in accordance with the type or the like of a vehicle mounted with the vehicle headlight 1.

Moreover, in the case of the present embodiment, the projection area is positioned outside the light distribution pattern $PTN_L$ of the low beam L. In this case, it is possible to suppress a part of the light distribution pattern $PTN_L$ from becoming noticeably bright, compared to the case where the projection area is positioned within the light distribution pattern $PTN_L$ of the low beam L, and as a result of this, it can be easier to operate.

Moreover, the vehicle headlight 1 of the present embodiment has a plurality of light emitting optical systems including one light source and one diffraction grating. Namely, the vehicle headlight 1 has a first light emitting optical system 51R including one light source 52R and one diffraction grating 54R, a second light emitting optical system 51G including one light source 52G and one diffraction grating 54G, and a third light emitting optical system 51B including one light source 52B and one diffraction grating 54B. In addition to this, the vehicle headlight 1 of the present embodiment further includes a synthesis optical system 55 that synthesizes lights emitted from the respective light emitting optical systems 51R, 51G, and 51B. Also, the respective light sources 52R, 52G, and 52B emit light of mutually different predetermined wavelengths, and the respective diffraction gratings 54R, 54G, and 54B diffract light from the light sources 52R, 52G, and 52B so that light synthesized by the synthesis optical system 55 has the light distribution pattern $PTN_L$ of the low beam L.

In this case, light having a predetermined wavelength emitted from the respective light sources 52R, 52G, and 52B is diffracted by the diffraction gratings 54R, 54G, and 54B, and the light distribution pattern $PTN_L$ is formed. At this time, in the respective light emitting optical systems 51R, 51G, and 51B, since light diffracted by the diffraction gratings 54R, 54G, and 54B has a predetermined wavelength, it is possible to suppress color bleeding from occurring near edges of the light distribution pattern $PTN_L$ in the lights emitted from the respective diffraction gratings 54R, 54G, and 54B, even if the diffraction gratings 54R, 54G, and 54B have a wavelength dependency. In this way, light having the light distribution pattern $PTN_L$ in which color bleeding is suppressed is synthesized by the synthesis optical system 55, and a light distribution pattern $PTN_L$ of the low beam L is formed. Therefore, the low beam L irradiated by the vehicle headlight 1 of the present embodiment can suppress color bleeding from appearing near edges of the light distribution pattern $PTN_L$.

Moreover, in the vehicle headlight 1 of the present embodiment, the 0th-order lights $LC_R$, $LC_G$, and $LC_B$ advancing and passing through the respective diffraction gratings 54R, 54G, and 54B are synthesized by the synthesis optical system 55, and the optical element 60 lowers an energy density of the 0th-order light beam LC synthesized by the synthesis optical system 55.

Accordingly, an irradiation area of 0th-order light irradiated on the optical element 60 can be reduced, compared to the case where the 0th-order lights advancing and passing through the respective diffraction gratings 54R, 54G, and 54B are not synthesized. Therefore, it is possible to suppress a lowering by the optical element 60 of an energy density of high order diffracted light among lights emitted from the diffraction gratings 54R, 54G, and 54B.

Fourth Embodiment

Next, a fourth embodiment of the present invention will be described in detail with reference to FIG. 7. Note that, overlapping descriptions attached with the same reference numerals, except for particular descriptions, will be omitted for constituent elements the same or equivalent to those of the third embodiment.

Figure 7:
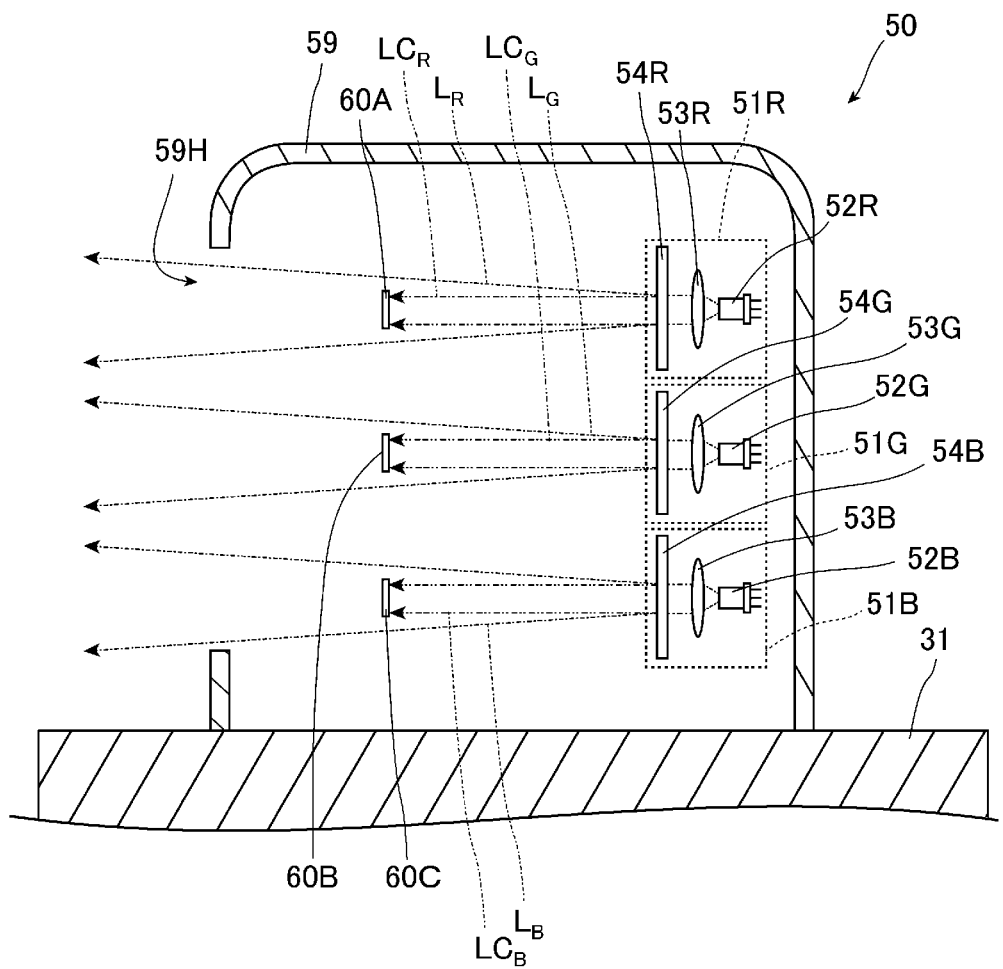
FIG. 7 is a figure showing, similar to FIG. 2, an optical system unit of a vehicle headlight according to a fourth embodiment of the present invention.

FIG. 7 is a figure showing, similar to FIG. 2, an optical system unit of a vehicle headlight according to the present embodiment. As shown in FIG. 7, the optical system unit 50 of the vehicle headlight of the present embodiment is different to the optical system unit 50 of the third embodiment for the point of not including the synthesis optical system 55, and emitting the respective lights emitted from the first light emitting optical system 51R, the second light emitting optical system 51G, and the third light emitting optical system 51B from the cover 59, in a state where not synthesized. In the present embodiment, the first light emitting optical system 51R, the second light emitting optical system 51G, and the third light emitting optical system 51B have an irradiation direction of light on an opening 59H side of the cover 59.

In the present embodiment, similar to the third embodiment, in the diffraction grating 54R of the first light emitting optical system 51R, the diffraction grating 54G of the second light emitting optical system 51G, and the diffraction grating 54B of the third light emitting optical system 51B, respectively, light is emitted so that synthesized light forms a light distribution pattern of the low beam L.

Namely, the first light $L_R$ emitted from the diffraction grating 54R, the second light $L_G$ emitted from the diffraction grating 54G, and the third light $L_B$ emitted from the diffraction grating 54B are respectively emitted from the opening 59H of the cover 59, and irradiated to the outside of the vehicle headlight via the front cover 12. At this time, the first light $L_R$, the second light $L_G$, and the third light $L_B$, and also the first 0th-order light $LC_R$, the second 0th-order light $LC_G$, and the third 0th-order light $LC_B$, are irradiated so that the external shapes of the respective light distribution patterns substantially match each other at a focal position separated a predetermined distance from the vehicle. This distance from the vehicle is, for example, 25 m. Namely, in the present embodiment, the irradiation directions of light of the first light emitting optical system 51R, the second light emitting optical system 51G, and the third light emitting optical system 51B are finely adjusted, so that the external shapes match each other such as described above.

Moreover, the optical system unit 50 of the vehicle headlight is different to the optical system unit 50 of the third embodiment for the point of including, instead of the optical element 60, optical elements 60A to 60C for lowering an energy density of 0th-order lights emitted from the first light emitting optical system 51R, the second light emitting optical system 51G, and the third light emitting optical system 51B. The optical element 60A is disposed on an optical path of the first 0th-order light $LC_R$ between the projection area of the first 0th-order light $LC_R$ and the diffraction grating 54R. The optical element 60B is disposed on an optical path of the second 0th-order light $LC_G$ between the projection area of the second 0th-order light $LC_G$ and the diffraction grating 54G, and the optical element 60C is disposed on an optical path of the third 0th-order light $LC_B$ between the projection area of the third 0th-order light $LC_B$ and the diffraction grating 54B. While the arrangement positions of the optical elements 60A to 60C are positions overlapping with the first light $L_R$ emitted from the diffraction grating 54R, the second light $L_G$ emitted from the diffraction grating 54G, and the third light $L_B$ emitted from the diffraction grating 54B, they may be at positions that do not overlap. In the present embodiment, the optical elements 60A to 60C are disposed within the cover 59, and are fixed to the cover 59 via a fixture that is not illustrated. The distance of an optical path between the respective optical elements 60A to 60C and the diffraction grating 54R is, for example, 100 mm. Therefore, it can be understood that the optical system unit 50 of the present embodiment has a configuration that is larger than that of the optical system unit 50 of the third embodiment.

According to the vehicle headlight of the present embodiment, since the synthesis optical system 55 of the third embodiment is not used, it is possible to form a simple configuration. Moreover, even if a light intensity of 0th-order light is higher than a light intensity of high order diffracted light, among lights emitted from the diffraction gratings 54R, 54G, and 54B, an energy density of this 0th-order light can be lowered by the optical elements 60A to 60C. Therefore, even if the synthesis optical system 55 is not used, similar to the third embodiment, it is possible to suppress the projection area of 0th-order light from becoming noticeably brighter than the light distribution pattern $PTN_L$ by high order diffracted light.

In the third and fourth embodiments, the first light emitting optical system that emits a red component of the first light $L_R$, the second light emitting optical system that emits a green component of the second light $L_G$, and the third light emitting optical system that emits a blue component of the third light $L_B$, are included. However, in the third and fourth embodiments, the lights emitted from the light sources respectively included in the three light emitting optical systems are not limited to red, green, and blue, as long as they have respectively different predetermined wavelengths.

Moreover, the number of light emitting optical systems may be one or two. In addition, the number of light emitting optical systems may be three or more. In this case, a fourth light emitting optical system that emits a yellow component of light of the low beam L may be provided. For example, in addition to the red, green, and blue light emitting optical systems, the fourth light emitting optical system may emit a yellow component of light of the low beam L. Moreover, in the case where a light intensity of a part of red, green, and blue is low, the fourth light emitting optical system may emit a color component of light the same as the color with a low light intensity.

Moreover, in the third and fourth embodiments, a white balance adjustment circuit may be further provided. This white balance adjustment circuit can achieve a desired white balance, by controlling a total light flux amount of light emitted from the light source 52R of the first light emitting optical system 51R, a total light flux amount of light emitted from the light source 52G of the second light emitting optical system 51G, and a total light flux amount of light emitted from the light source 52B of the third light emitting optical system 51B. For example, it may be possible to perform switching, so as to emit warm white light, or to emit blue white light, within the scope of the law.

In the third embodiment, the first optical element 55$f$ synthesizes the first light $L_R$ and the second light $L_G$ by transmitting the first light $L_R$ first light and reflecting the second light $L_G$, and the second optical element 55$s$ synthesizes the first light $L_R$, the second light $L_G$, and the third light $L_B$ by transmitting the first light $L_R$ and the second light $L_G$ synthesized by the first optical element 55$f$ and reflecting the third light $L_B$. However, for example, it may have a configuration where the third light $L_B$ and the second light $L_G$ are synthesized in the first optical element 55$f$, and the third light $L_B$ and the second light $L_G$ synthesized by the first optical element 55$f$ and the first light $L_R$ are synthesized in the second optical element 55$s$. In this case, the positions of the first light emitting optical system 51R and the third light emitting optical system 51B of the third embodiment are switched. Moreover, in this case, it will have a configuration where the third 0th-order light $LC_B$ and the second 0th-order light $LC_G$ are synthesized in the first optical element 55$f$, and the third 0th-order light $LC_B$ and the second 0th-order light $LC_G$ synthesized by the first optical element 55$f$ and the first 0th-order light $LC_R$ are synthesized in the second optical element 55$s$. In the third embodiment, a band pass filter that transmits light of a predetermined wavelength band and reflects light of other wavelength bands may be used in the first optical element 55$f$ or the second optical element 55$s$. The synthesis optical system 55 may combine and synthesize external shapes of lights emitted from the respective light emitting optical systems, and is not limited to the third embodiment.

Moreover, in the third embodiment, the 0th-order lights $LC_R$, $LC_G$, and $LC_B$ advancing and passing through the respective diffraction gratings 54R, 54G, and 54B may not be synthesized by the synthesis optical system 55, and may be irradiated on different areas of the optical element 60. However, as described above, in the case where reducing an irradiation area of 0th-order light irradiated on the optical element 60, and suppressing a lowering of an energy density of high order diffracted light by the optical element 60, it is preferable that the 0th-order lights $LC_R$, $LC_G$, and $LC_B$ advancing and passing through the respective diffraction gratings 54R, 54G, and 54B are synthesized by the synthesis optical system 55.

In the third and fourth embodiments, while the projection area is positioned outside of the light distribution pattern $PTN_L$ of the low beam L, it may be positioned within this light distribution pattern $PTN_L$. In this case, it is preferable that the projection area is included within an area having a light intensity of half a value or less of a highest light intensity from within a light intensity distribution of high order diffracted light diffracted by the diffraction gratings 54R, 54G, and 54B, among the light distribution pattern $PTN_L$ of the low beam L. According to this, it will be easy for a light intensity distribution of the light distribution pattern to be smoothly formed, on the basis of a position having a highest light intensity within the light intensity distribution, compared to the case where the projection area is included in an area higher than half a value of a highest light intensity within the light intensity distribution of high order diffracted light.

Moreover, even though the optical element 60 of the third and fourth embodiments may make an energy density of the entering 0th-order light to be zero, or may emit the 0th-order light with an energy density smaller than an energy density of the entering 0th-order light. However, as described above, in the case where the projection area is positioned within the light distribution pattern $PTN_L$ of the low beam L, it is preferable to adopt the optical element 60 that emits 0th-order light with an energy density smaller than an energy density of the entering 0th-order light. In this way, while using 0th-order light as the light distribution pattern $PTN_L$ of the low beam L, it is possible to suppress the projection area of 0th-order light from becoming noticeably bright in the light distribution pattern $PTN_L$.

Figure 8:
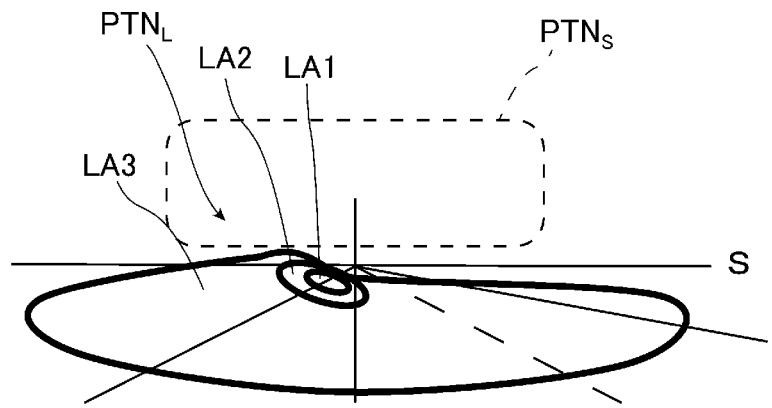
FIG. 8 is a figure showing a light distribution pattern of a low beam and a light distribution pattern of light for visually recognizing a sign.
Figure 9:
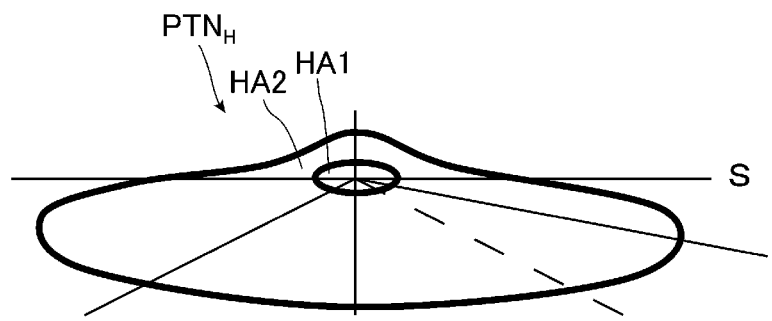
FIG. 9 is a figure showing a light distribution pattern of a high beam.

In the third and fourth embodiments, the light distribution pattern $PTN_L$ of the low beam L is formed as a light distribution pattern for dark place illumination. However, it is not limited to a light distribution pattern $PTN_L$ of the low beam L, if it is a light distribution pattern for dark place illumination. Note that, a light distribution pattern for dark place illumination is used at night or in dark places such as tunnels. For example, as shown in FIG. 8, there are cases where the light distribution pattern $PTN_L$ of the low beam L, and a light distribution pattern $PTN_S$ of light for visually recognizing a sign positioned outside, for example, above this light distribution pattern $PTN_L$, are formed as a light distribution pattern for dark place illumination. In this case, it is preferable that light for visually recognizing a sign is included in high order diffracted light diffracted by the respective diffraction gratings 54R, 54G, and 54B. Further, for example, as shown in FIG. 9, there are cases where a light distribution pattern $PTN_H$ of a high beam is formed as a light distribution pattern for dark place illumination. Among this light distribution pattern $PTN_H$ of a high beam, an area HA1 is an area having the highest light intensity, and an area HA2 is an area having a light intensity lower than that of the area HA1. Namely, the respective diffraction gratings 54R, 54G, and 54B diffract light so that synthesized light forms the light distribution pattern $PTN_H$ that includes a light intensity distribution of a high beam.

Moreover, in the third and fourth embodiments, a headlight of an automobile is exemplified as the vehicle headlight 1. However, the third and fourth embodiments are not limited to a headlight of an automobile, and may be a headlight of another vehicle. Moreover, the third and fourth embodiments are not limited to a headlight, and may be a lamp such as a rear light, a tail light, a brake light, or an indicator light.

That is, the present invention exemplified in the third and fourth embodiments may be a vehicle illumination lamp such as follows. Namely, the vehicle illumination lamp includes a light source, a diffraction grating for diffracting light incident from the light source, and an optical element disposed, between a projection area of light components advancing and passing through the diffraction grating and the diffraction grating, on an optical path of the light components, and lowering an energy density of light. Light diffracted by the diffraction grating from among light emitted from the diffraction grating is irradiated in a predetermined light distribution pattern. It can be easily operated, if such a vehicle illumination lamp.

Fifth Embodiment

Figure 10:
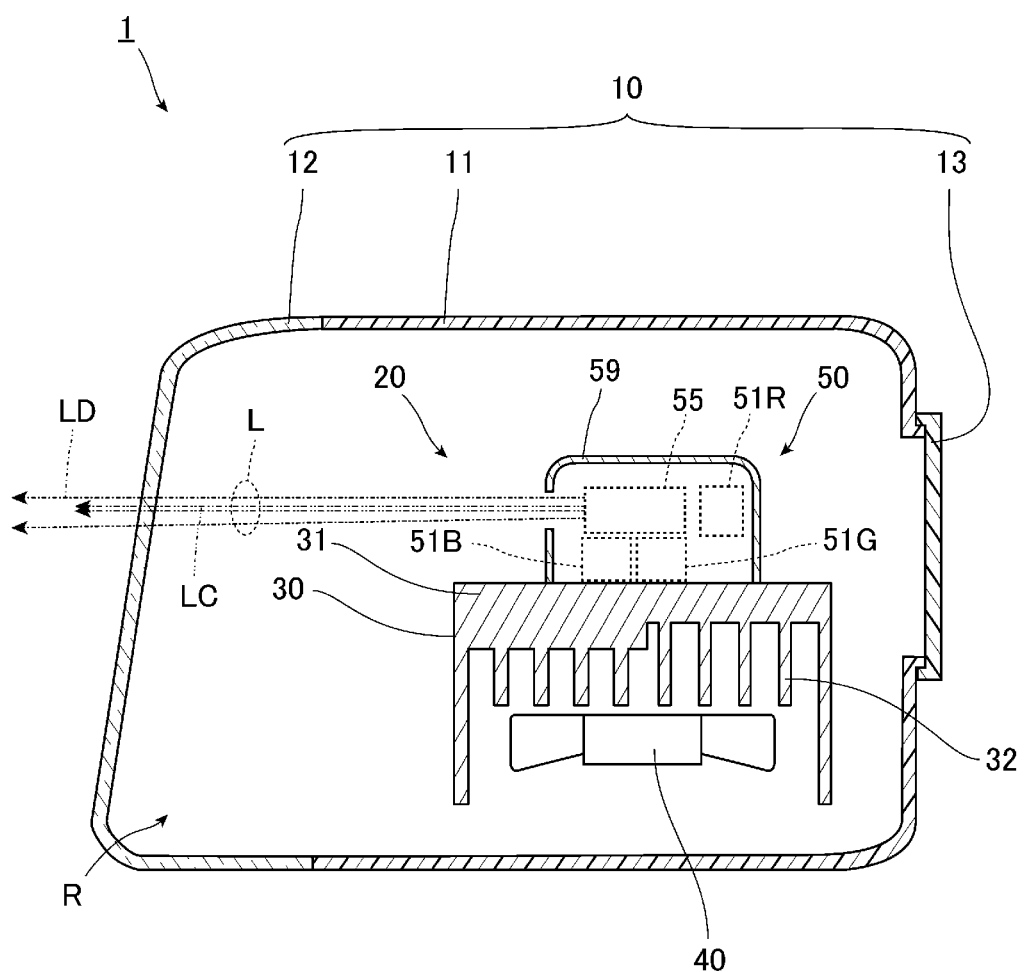
FIG. 10 is a cross-sectional view schematically showing a vehicle that includes a vehicle headlight according to a fifth embodiment of the present invention.
Figure 11:
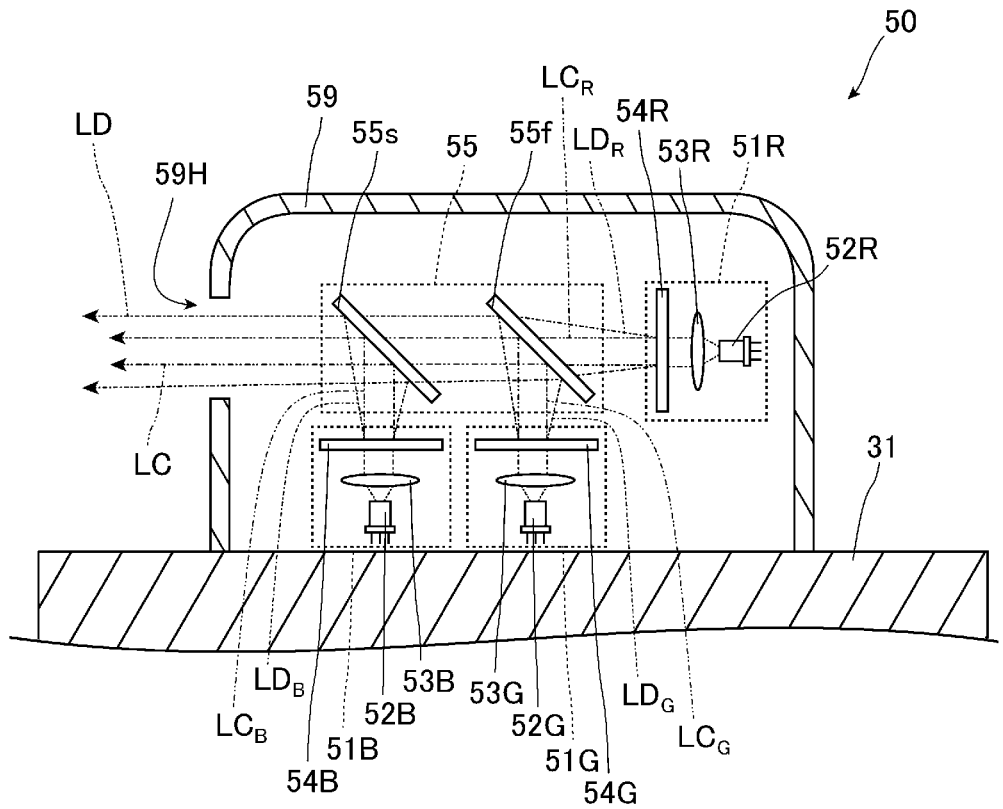
FIG. 11 is an enlarged view of an optical system unit of the vehicle headlight of FIG. 10.

Next, a fifth embodiment of the present invention will be described. Note that, overlapping descriptions attached with the same reference numerals, except for particular descriptions, will be omitted for constituent elements the same or equivalent to those of the first embodiment. FIG. 10 is a cross-sectional view schematically showing a vehicle that includes a vehicle headlight according to the present embodiment. FIG. 11 is an enlarged view of an optical system unit of the vehicle headlight of FIG. 10. As shown in FIGS. 10 and 11, while the configuration of the vehicle headlight 1 in the present embodiment is the same as the configuration of the vehicle headlight 1 in the first embodiment, a light distribution pattern of light emitted by the vehicle headlight 1 of the present embodiment is different to a light distribution pattern of light emitted by the vehicle headlight 1 of the first embodiment.

The diffraction grating 54R of the present embodiment diffracts laser light incident from the collimator lens 53R so as to have a predetermined light distribution pattern. Specifically, the diffraction grating 54R, in the synthesis optical system 55 described later, diffracts laser light incident from the collimator lens 53R so that lights respectively emitted from the first light emitting optical system 51R, the second light emitting optical system 51G, and the third light emitting optical system 51B have a light distribution pattern of the diffracted light beam LD. A light intensity distribution is also included in this light distribution pattern. Accordingly, the diffraction grating 54R of the present embodiment diffracts laser light incident from the collimator lens 53R, so as to have a light intensity distribution based on a light intensity distribution of a light distribution pattern of the diffracted light beam LD, along with light diffracted by the diffraction grating 54R having a same external shape as an external shape of a light distribution pattern of the diffracted light beam LD.

This light diffracted by the diffraction grating 54R is high order diffracted light having an order of 1 or more, and in addition to this high order diffracted light, 0th-order light advancing and passing through the diffraction grating 54R without being diffracted is emitted from the diffraction grating 54R. In the present embodiment, 0th-order light is emitted from the diffraction grating 54R, so that a projection area of the 0th-order light beam LC emitted from the synthesis optical system 55 described later is positioned within a light distribution pattern of the low beam L formed by the 0th-order light beam LC and the diffracted light beam LD.

In this way, a red component of high order diffracted light among the low beam L, and a red component of 0th-order light among the 0th-order light beam LC are emitted from the first light emitting optical system 51R. In the present embodiment, a red component of high order diffracted light emitted from the first light emitting optical system 51R is set as first light $LD_R$, and a red component of the 0th-order light is set as first 0th-order light $LC_R$.

The diffraction grating 54G diffracts laser light incident from the collimator lens 53G so as to have a predetermined light distribution pattern, and the diffraction grating 54B diffracts laser light incident from the collimator lens 53B so as to have a predetermined light distribution pattern. Specifically, the diffraction gratings 54G and 54B, in the synthesis optical system 55, respectively diffract laser light incident from the collimator lenses 53G and 53B so that lights respectively emitted from the first light emitting optical system 51R, the second light emitting optical system 51G, and the third light emitting optical system 51B have a light distribution pattern of the diffracted light beam LD. A light intensity distribution is also included in the light distribution pattern, such as described above. Accordingly, the diffraction gratings 54G and 54B of the present embodiment respectively diffract laser light incident from the collimator lenses 53G and 53B, so as to have a light intensity distribution based on a light intensity distribution of a light distribution pattern of the diffracted light beam LD, along with laser light respectively emitted from the diffraction gratings 54G and 54B having a same external shape as an external shape of a light distribution pattern of the diffracted light beam LD.

The light diffracted by this diffraction grating 54G is high order diffracted light having an order of 1 or more, and in addition to this high order diffracted light, 0th-order light advancing and passing through the diffraction grating 54G without being diffracted is emitted from the diffraction grating 54G. In the present embodiment, 0th-order light is emitted from the diffraction grating 54G, so that a projection area of the 0th-order light beam LC emitted from the synthesis optical system 55 described later is positioned within a light distribution pattern of the low beam L formed by the 0th-order light beam LC and the diffracted light beam LD.

Similarly, this light diffracted by the diffraction grating 54B is high order diffracted light having an order of 1 or more, and in addition to this high order diffracted light, 0th-order light advancing and passing through the diffraction grating 54B without being diffracted is emitted from the diffraction grating 54B. In the present embodiment, 0th-order light is emitted from the diffraction grating 54B, so that a projection area of the 0th-order light beam LC emitted from the synthesis optical system 55 described later is positioned within a light distribution pattern of the low beam L formed by the 0th-order light beam LC and the diffracted light beam LD.

In this way, a green component of high order diffracted light among the low beam L, and a green component of 0th-order light among the 0th-order light beam LC are emitted from the second light emitting optical system 51G. Moreover, a blue component of high order diffracted light among the low beam L, and a blue component of 0th-order light among the 0th-order light beam LC are emitted from the third light emitting optical system 51B. In the present embodiment, a green component of high order diffracted light emitted from the second light emitting optical system 51G is set as second light $LD_G$, a green component of 0th-order light is set as second 0th-order light $LC_G$, a blue component of high order diffracted light emitted from the third light emitting optical system 51B is set as third light $LD_B$, and a blue component of 0th-order light is set as third 0th-order light $LC_B$. Therefore, in the present embodiment, the first light $LD_R$ has a longest wavelength, and the wavelength becomes shorter in the order of the second light $LD_G$ and the third light $LD_B$. Similarly, the first 0th-order light $LC_R$ has a longest wavelength, and the wavelength becomes shorter in the order of the second 0th-order light $LC_G$ and the third 0th-order light $LC_B$.

Note that, a light intensity distribution based on a light intensity distribution of a light distribution pattern of the diffracted light beam LD means that the light intensities of the respective high order diffracted lights emitted from the diffraction gratings 54R, 54G, and 54B are high, at a portion where a light intensity in a light distribution pattern of the diffracted light beam LD is high.

The synthesis optical system 55 includes a first optical element 55f and a second optical element 55s. The first optical element 55f is an optical element that synthesizes the first light $LD_R$ emitted from the first light emitting optical system 51R and the second light $LD_G$ emitted from the second light emitting optical system 51G. Moreover, the first optical element 55f is also an optical element that synthesizes the first 0th-order light $LC_R$ emitted from the first light emitting optical system 51R and the second 0th-order light $LC_G$ emitted from the second light emitting optical system 51G. In the present embodiment, the first optical element 55f synthesizes the first light $LD_R$ and the second light $LD_G$ by transmitting the first light $LD_R$ and reflecting the second light $LD_G$, and synthesizes the first 0th-order light $LC_R$ and the second 0th-order light $LC_G$ by transmitting the first 0th-order light $LC_R$ and reflecting the second 0th-order light $LC_G$.

The second optical element 55s is an optical element that synthesizes the first light $LD_R$ and the second light $LD_G$ synthesized by the first optical element 55f and the third light $LD_B$ emitted from the third light emitting optical system 51B. Moreover, the second optical element 55s is also an optical element that synthesizes the first 0th-order light $LC_R$ and the second 0th-order light $LC_G$ synthesized by the first optical element 55f and the third 0th-order light $LC_B$ emitted from the third light emitting optical system 51B. In the present embodiment, the second optical element 55s synthesizes the first light $LD_R$, the second light $LD_G$, and the third light $LD_B$ by transmitting the first light $LD_R$ and the second light $LD_G$ synthesized by the first optical element 55f and reflecting the third light $LD_B$. Moreover, the second optical element 55s synthesizes the first 0th-order light $LC_R$, the second 0th-order light $LC_G$, and the third 0th-order light $LC_B$ by transmitting the first 0th-order light $LC_R$ and the second 0th-order light $LC_G$ synthesized by the first optical element 55f and reflecting the third 0th-order light $LC_B$.

An optical filter, in which an oxide film is layered on a glass substrate, can be included as such a first optical element 55f and second optical element 55s. By controlling the type and thickness of this oxide film, it is possible to form a configuration that transmits light having a wavelength longer than a predetermined wavelength, and reflects light having a wavelength shorter than this wavelength.

In this way, the diffracted light beam LD is emitted, by having the first light $LD_R$, the second light $LD_G$, and the third light $LD_B$ synthesized, and the 0th-order light beam LC is emitted, by having the first 0th-order light $LC_R$, the second 0th-order light $LC_G$, and the third 0th-order light $LC_B$ synthesized, from the synthesis optical system 55.

Next, the emission of light by the vehicle headlight 1 of the present embodiment will be described.

First, by supplying power from a power source that is not illustrated, laser light is emitted from the respective light sources 52R, 52G, and 52B. As described above, red laser light is emitted from the light source 52R, green laser light is emitted from the light source 52G, and blue laser light is emitted from the light source 52B. The respective laser lights are collimated by collimator lenses 53R, 53G, and 53B, and afterwards are incident on the diffraction gratings 54R, 54G, and 54B. Then, as described above, the respective laser lights are diffracted by the diffraction gratings 54R, 54G, and 54B, the first light $LD_R$ that is a red component of the diffracted light beam LD is emitted from the first light emitting optical system 51R, the second light $LD_G$ that is a green component of the diffracted light beam LD is emitted from the second light emitting optical system 51G, and the third light $LD_B$ that is a blue component of the diffracted light beam LD is emitted from the third light emitting optical system 51B. Moreover, as described above, by respectively advancing and passing through the diffraction gratings 54R, 54G, and 54B, the first 0th-order light $LC_R$ that is a red component of the 0th-order light beam LC is emitted from the first light emitting optical system 51R, the second 0th-order light $LC_G$ that is a green component of the 0th-order light beam LC is emitted from the second light emitting optical system 51G, and the third 0th-order light $LC_B$ that is a blue component of the 0th-order light beam LC is emitted from the third light emitting optical system 51B.

In the synthesis optical system 55, first, the first light $LD_R$ and the second light $LD_G$ are synthesized and emitted by the first optical element 55f, and the first 0th-order light $LC_R$ and the second 0th-order light $LC_G$ are synthesized and emitted by the first optical element 55f. The first light $LD_R$ and the second light $LD_G$ synthesized by the first optical element 55f are synthesized with the third light $LD_B$ by the second optical element 55s, and the first 0th-order light $LC_R$ and the second 0th-order light $LC_G$ synthesized by the first optical element 55f are synthesized with the third 0th-order light $LC_B$ by the second optical element 55s. At this time, since the external shapes of the respective lights $LD_R$, $LD_G$, and $LD_B$ are the same as the external shape of the diffracted light beam LD, the external shapes of the respective lights $LD_R$, $LD_G$, and $LD_B$ will be synthesized by matching each other. In addition, since the external shapes of the respective 0th-order lights $LC_R$, $LC_G$, and $LC_B$ are also the same, the external shapes of the respective 0th-order lights $LC_R$, $LC_G$, and $LC_B$ will be synthesized by matching each other. Namely, the positions of each of the light emitting optical systems and the synthesis optical system are finely adjusted, so that the external shape of the first light $LD_R$, the external shape of the second light $LD_G$, and the external shape of the third light $LD_B$, and also the external shape of the first 0th-order light $LC_R$, the external shape of the second 0th-order light $LC_G$, and the external shape of the third 0th-order light $LC_B$, are combined by the synthesis optical system such as described above.

In this way, light in which the red first light $LD_R$, the green second light $LD_G$, and the blue third light $LD_B$ are synthesized becomes white, and this white light is emitted from the synthesis optical system 55 as the diffracted light beam LD. Moreover, light in which the red first 0th-order light $LC_R$, the green second 0th-order light $LC_G$, and the blue third 0th-order light $LC_B$ are synthesized becomes white, and this white light is emitted from the synthesis optical system 55 as the 0th-order light beam LC.

The diffracted light beam LD and the 0th-order light beam LC emitted from the synthesis optical system 55 are emitted from the opening 59H of the cover 59, and are emitted from the vehicle headlight 1 to the front of the vehicle via the front cover 12. A light distribution pattern of the low beam L is formed in front of the vehicle by the diffracted light beam LD and the 0th-order light beam LC.

Figure 12:
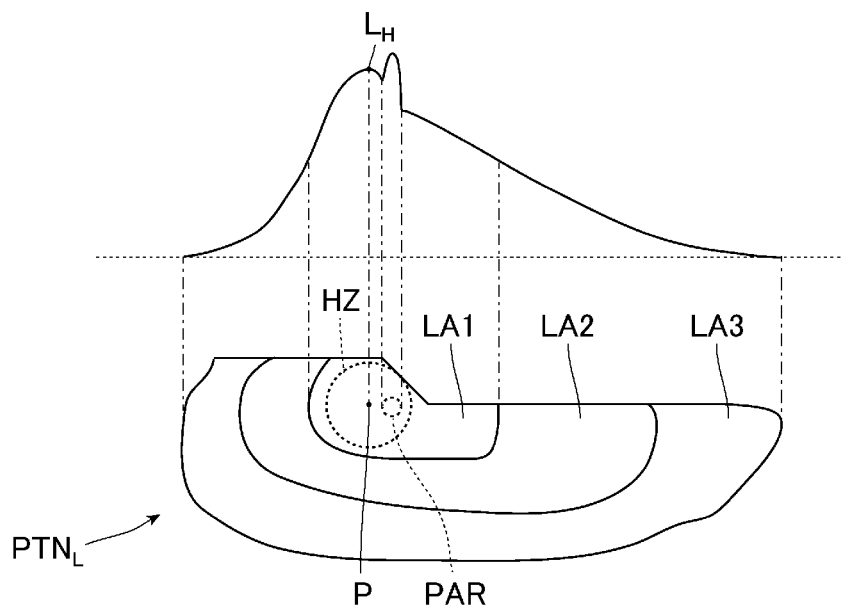
FIG. 12 is a figure showing a light distribution pattern of a low beam and a light intensity distribution of this light distribution pattern.

FIG. 12 is a diagram showing a light distribution pattern of a low beam and a light intensity distribution of this light distribution pattern in the present embodiment. As shown in FIG. 12, the light distribution pattern $PTN_L$ of the low beam L includes a first area LA1, a second area LA2, and a third area LA3, and the light intensity decreases in the order of the first area LA1, the second area LA2, and the third area LA3.

The first area LA1 is an area having a light intensity higher than a first light intensity threshold within a light intensity distribution of the diffracted light beam LD that is high order diffracted light, and in this first area LA1, a portion P is included that has a highest light intensity $L_H$ within a light intensity distribution of the diffracted light beam LD. The second area LA2 is an area having a light intensity equal to or less than the first light intensity threshold and higher than a second light intensity threshold set lower than the first light intensity threshold within a light intensity distribution of the diffracted light beam LD, and the third area LA3 is an area equal to or less than the second light intensity threshold within the light intensity distribution of the diffracted light beam LD. The first light intensity threshold is, for example, half a value of the highest light intensity $L_H$ within the light intensity distribution of the diffracted light beam LD.

Among such a light distribution pattern $PTN_L$ of the low beam L, a projection area PAR of 0th order light on which is irradiated the 0th-order light beam LC is positioned within the first area LA1, and is also positioned within a hot zone HZ narrower than this first area LA1. However, the light projection area PAR of the 0th-order light is positioned to avoid the portion P having the highest light intensity $L_H$ within the light intensity distribution of the diffracted light beam LD. Note that, the light intensity of the projection area PAR is a total value of the light intensity of the diffracted light beam LD and a light intensity of the 0th-order light beam LC. In the example shown in FIG. 12, while the light intensity of the projection area PAR is higher than the highest light intensity $L_H$ within the light intensity distribution of the diffracted light beam LD, it may be lower than the light intensity $L_H$. For example, the light intensity of the projection area PAR can be made lower than the light intensity $L_H$, by having the diffracted light beam LD unirradiated on the projection area PAR.

As described above, the vehicle headlight 1 of the present embodiment includes the light sources 52R, 52G, and 52B, and the diffraction gratings 54R, 54G, and 54B that diffract lights incident from the light sources 52R, 52G, and 52B.

Lights diffracted by the diffraction gratings 54R, 54G, and 54B are synthesized by the synthesis optical system 55, and are emitted from the synthesis optical system 55 as a diffracted light beam LD. Further, lights advancing and passing through the diffraction gratings 54R, 54G, and 54B are synthesized by the synthesis optical system 55, and are emitted from the synthesis optical system 55 as a 0th-order light beam LC. A light distribution pattern of the low beam L is formed by the diffracted light beam LD and the 0th-order light beam LC. As shown in FIG. 12, the projection area PAR of the 0th-order light beam LC within the light distribution pattern is positioned within an area having a light intensity higher than half a value of the highest light intensity $L_H$ within the light intensity distribution of the diffracted light beam LD that is high order diffracted light.

Therefore, even if the 0th-order light having a light intensity higher than a light intensity of high order diffracted light is irradiated on the projection area PAR, it is possible to suppress the projection area PAR from becoming noticeably bright within the light distribution pattern $PTN_L$ of the low beam L. Therefore, the vehicle headlight 1 of the present embodiment can be easily operated, compared to the case where the projection area PAR is disposed outside an area having a light intensity higher than half a value of a highest light intensity $L_H$ within a light intensity distribution of the diffracted light beam LD.

Note that, in the present embodiment, the projection area PAR is positioned to avoid the portion P having the highest light intensity $L_H$ within the light intensity distribution of the diffracted light beam LD. Therefore, it is possible to suppress the portion P having the highest light intensity $L_H$ within the light distribution pattern $PTN_L$ of the diffracted light beam LD from becoming excessively bright.

Moreover, by having the projection area PAR disposed within the hot zone HZ, while using the 0th-order light beam LC as the light distribution pattern $PTN_L$ of the low beam L, it is possible to suppress the projection area PAR from becoming noticeably bright in the light distribution pattern $PTN_L$.

Moreover, the vehicle headlight 1 of the present embodiment has a plurality of light emitting optical systems including one light source and one diffraction grating. Namely, the vehicle headlight 1 has a first light emitting optical system 51R including one light source 52R and one diffraction grating 54R, a second light emitting optical system 51G including one light source 52G and one diffraction grating 54G, and a third light emitting optical system 51B including one light source 52B and one diffraction grating 54B. In addition to this, the vehicle headlight 1 of the present embodiment further includes a synthesis optical system 55 that synthesizes lights emitted from the respective light emitting optical systems 51R, 51G, and 51B. Also, the respective light source 52R, 52G, and 52B emit light of mutually different predetermined wavelengths, and the respective diffraction gratings 54R, 54G, and 54B emit light from the light source 52R, 52G, and 52B so that light synthesized by the synthesis optical system 55 has the light distribution pattern $PTN_L$ of the low beam L.

In this case, the light distribution pattern $PTN_L$ is formed through the diffraction gratings 54R, 54G, and 54B by lights of predetermined wavelengths emitted from the respective light sources 52R, 52G, and 52B. At this time, in the respective light emitting optical systems 51R, 51G, and 51B, since light diffracted by the diffraction gratings 54R, 54G, and 54B has a predetermined wavelength, it is possible to suppress color bleeding from occurring near edges of the light distribution pattern $PTN_L$ in the lights emitted from the respective diffraction gratings 54R, 54G, and 54B, even if the diffraction gratings 54R, 54G, and 54B have a wavelength dependency. In this way, light having the light distribution pattern $PTN_L$ in which color bleeding is suppressed is synthesized by the synthesis optical system 55, and a light distribution pattern $PTN_L$ of the low beam L is formed. Therefore, the low beam L irradiated by the vehicle headlight 1 of the present embodiment can suppress color bleeding from appearing near edges of the light distribution pattern $PTN_L$.

Moreover, in the vehicle headlight 1 of the present embodiment, the 0th-order lights $LC_R$, $LC_G$, and $LC_B$ advancing and passing through the respective diffraction gratings 54R, 54G, and 54B are synthesized by the synthesis optical system 55, and are irradiated on the projection area PAR. In this case, even if the diffraction gratings 54R, 54G, and 54B have a wavelength dependency such as described above, the 0th-order lights $LC_R$, $LC_G$, and $LC_B$ passing through the respective diffraction gratings 54R, 54G, and 54B can be made a same white color. Therefore, in the vehicle headlight 1 of the present embodiment, it is possible to reduce a driver from being unnecessarily aware of the projection area PAR, and it becomes easier to operate.

Sixth Embodiment

Next, a sixth embodiment of the present invention will be described in detail with reference to FIG. 13. Note that, overlapping descriptions attached with the same reference numerals, except for particular descriptions, will be omitted for constituent elements the same or equivalent to those of the fifth embodiment.

Figure 13:
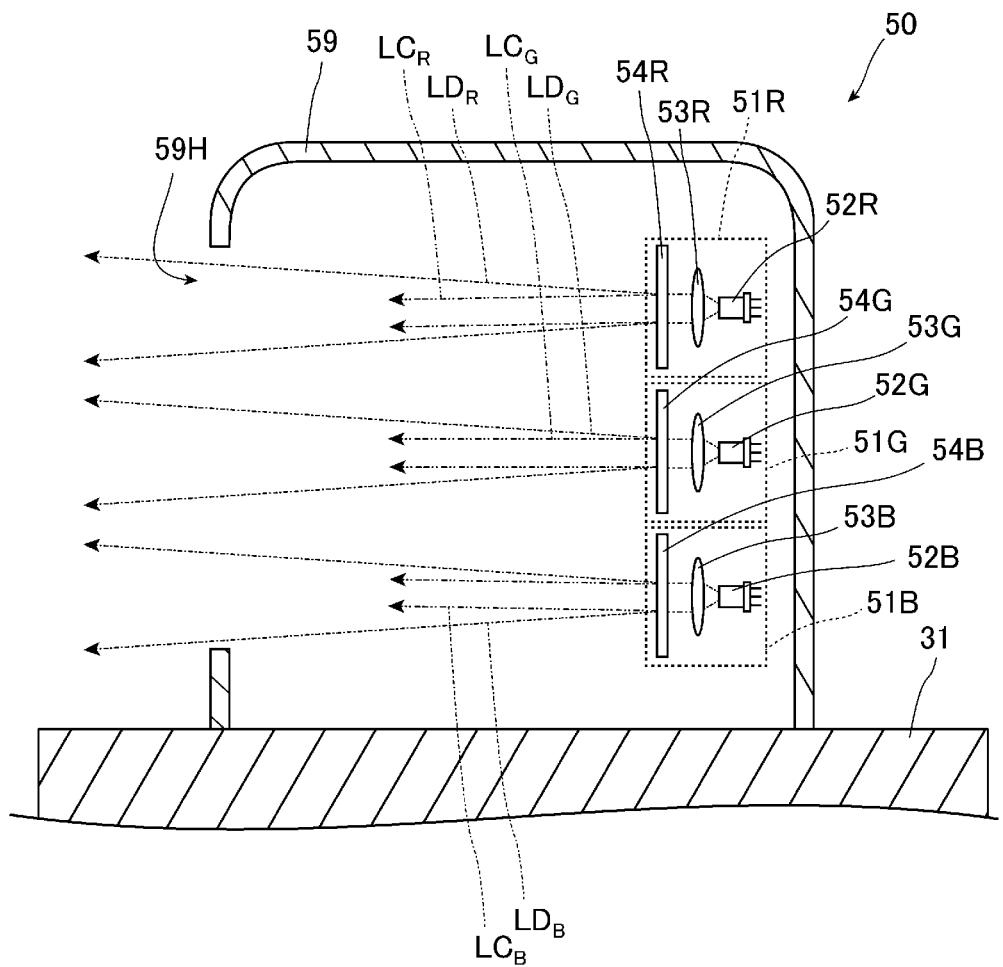
FIG. 13 is a figure showing, similar to FIG. 11, an optical system unit of a vehicle headlight according to a sixth embodiment of the present invention.

FIG. 13 is a figure showing, similar to FIG. 11, an optical system unit of a vehicle headlight according to the present embodiment. As shown in FIG. 13, the optical system unit 50 of the vehicle headlight of the present embodiment is different to the optical system unit 50 of the fifth embodiment for the point of not including the synthesis optical system 55, and emitting the respective lights emitted from the first light emitting optical system 51R, the second light emitting optical system 51G, and the third light emitting optical system 51B from the cover 59, in a state where not synthesized. In the present embodiment, the first light emitting optical system 51R, the second light emitting optical system 51G, and the third light emitting optical system 51B have an irradiation direction of light on an opening 59H side of the cover 59.

In the present embodiment, similar to the fifth embodiment, in the diffraction grating 54R of the first light emitting optical system 51R, the diffraction grating 54G of the second light emitting optical system 51G, and the diffraction grating 54B of the third light emitting optical system 51B, respectively, light is emitted so that synthesized light forms a light distribution pattern of the low beam L.

Namely, the first light $LD_R$ emitted from the diffraction grating 54R, the second light $LD_G$ emitted from the diffraction grating 54G, and the third light $LD_B$ emitted from the diffraction grating 54B are respectively emitted from the opening 59H of the cover 59, and irradiated to the outside of the vehicle headlight via the front cover 12. Moreover, the first 0th-order light $LC_R$ emitted from the diffraction grating 54R, the second 0th-order light $LC_G$ emitted from the diffraction grating 54G, and the third 0th-order light $LC_B$ emitted from the diffraction grating 54B are respectively emitted from the opening 59H of the cover 59, and irradiated to the outside of the vehicle headlight via the front cover 12. At this time, the first light $LD_R$, the second light $LD_G$, and the third light $LD_B$, and also the first 0th-order light $LC_R$, the second 0th-order light $LC_G$, and the third 0th-order light $LC_B$, are irradiated so that the external shapes of the respective light distribution patterns substantially match each other at a focal position separated a predetermined distance from the vehicle. This distance from the vehicle is, for example, 25 m. Accordingly, the light distribution pattern of the low beam L is formed at a position separated a predetermined distance from the vehicle. This light distribution pattern is the light distribution pattern $PTN_L$ shown in FIG. 12, and has a same light intensity distribution as the light intensity distribution shown in FIG. 12. Accordingly, similar to the fifth embodiment, the projection area PAR of 0th-order light within the light distribution pattern $PTN_L$ is positioned within an area having a light intensity higher than half a value of the highest light intensity $L_H$ within the light intensity distribution of the diffracted light beam LD that is high order diffracted light.

According to the vehicle headlight of the present embodiment, since the synthesis optical system 55 of the fifth embodiment is not used, it is possible to form a simple configuration. Moreover, according to the vehicle headlight of the present embodiment, since the projection area PAR of 0th-order light is positioned within an area having a light intensity higher than half a value of the highest light intensity $L_H$ within the light intensity distribution of the high order diffracted light, similar to the fifth embodiment, it is possible to suppress the projection area PAR from becoming noticeably bright. Note that, the external shape of the first light $LD_R$, the external shape of the second light $LD_G$, and the external shape of the third light $LD_B$, and also the external shape of the first 0th-order light $LC_R$, the external shape of the second 0th-order light $LC_G$, and the external shape of the third 0th-order light $LC_B$, of the present embodiment tend to slightly deviate from each other except for at the focal position. However, when compared with light obtained by having white light incident on one diffraction grating, it is possible to suppress this deviation of the external shapes. Therefore, according to the present embodiment, a vehicle headlight can be realized that is capable of suppressing color bleeding while being reduced in size.

Note that, in the fifth and sixth embodiments, the first light emitting optical system that emits a red component of the first light $LD_R$, the second light emitting optical system that emits a green component of the second light $LD_G$, and the third light emitting optical system that emits a blue component of the third light $LD_B$, are included. However, in the vehicle headlight of the fifth and sixth embodiments, the lights emitted from the light sources respectively included in the three light emitting optical systems are not limited to red, green, and blue, as long as they have respectively different predetermined wavelengths.

Moreover, the number of light emitting optical systems may be one or two. In addition, the number of light emitting optical systems may be three or more. In this case, for example, a fourth light emitting optical system that emits a yellow component of light of the low beam L may be provided. In this case, in addition to the red, green, and blue light emitting optical systems, the fourth light emitting optical system may emit a yellow component of light of the low beam L. Moreover, in the case where a light intensity of a part of red, green, and blue is low, the fourth light emitting optical system may emit a color component of light the same as the color with a low light intensity.

Moreover, in the fifth and sixth embodiments, a white balance adjustment circuit may be further provided. This white balance adjustment circuit can achieve a desired white balance, by controlling a total light flux amount of light emitted from the light source 52R of the first light emitting optical system 51R, a total light flux amount of light emitted from the light source 52G of the second light emitting optical system 51G, and a total light flux amount of light emitted from the light source 52B of the third light emitting optical system 51B. For example, it may be possible to perform switching, so as to emit warm white light or to emit blue white light, within the scope of the law.

Moreover, in the fifth embodiment, the first optical element 55$f$ synthesizes the first light $LD_R$ and the second light $LD_G$ by transmitting the first light $LD_R$ first light and reflecting the second light $LD_G$, and the second optical element 55$s$ synthesizes the first light $LD_R$, the second light $LD_G$, and the third light $LD_B$ by transmitting the first light $LD_R$ and the second light $LD_G$ synthesized by the first optical element 55$f$ and reflecting the third light $LD_B$. However, for example, it may have a configuration where the third light $LD_B$ and the second light $LD_G$ are synthesized in the first optical element 55$f$, and the third light $LD_B$ and the second light $LD_G$ synthesized by the first optical element 55$f$ and the first light $LD_R$ are synthesized in the second optical element 55$s$. In this case, the positions of the first light emitting optical system 51R and the third light emitting optical system 51B of the fifth embodiment are switched. Moreover, in this case, it will have a configuration where the third 0th-order light $LC_B$ and the second 0th-order light $LC_G$ are synthesized in the first optical element 55$f$, and the third 0th-order light $LC_B$ and the second 0th-order light $LC_G$ synthesized by the first optical element 55$f$ and the first 0th-order light $LC_R$ are synthesized in the second optical element 55$s$. In the fifth embodiment, a band pass filter that transmits light of a predetermined wavelength band and reflects light of other wavelength bands may be used in the first optical element 55$f$ or the second optical element 55$s$. The synthesis optical system 55 may combine and synthesize external shapes of lights emitted from the respective light emitting optical systems, and is not limited to the fifth embodiment.

Moreover, in the fifth embodiment, the 0th-order lights $LC_R$, $LC_G$, and $LC_B$ advancing and passing through the respective diffraction gratings 54R, 54G, and 54B may not be synthesized by the synthesis optical system 55, and may be irradiated on different areas of the projection area PAR. However, as described above, in order to reduce a driver or the like from being unnecessarily aware of the projection area PAR, it is preferable that the 0th-order lights $LC_R$, $LC_G$, and $LC_B$ advancing and passing through the respective diffraction gratings 54R, 54G, 54B are synthesized.

Moreover, in the fifth and sixth embodiments, while the projection area PAR is positioned to avoid a position having the highest light intensity $L_H$ within the light intensity distribution of high order diffracted light, it may include this position. In this case, the brightest area within the light distribution pattern $PTN_L$ of the low beam L will be mostly unchanged, regardless of whether or not the light intensity of the 0th-order light is large. Accordingly, it will be easy for the light intensity distribution of the light distribution pattern $PTN_L$ of the low beam L to be more smoothly formed, on the basis of a position having a highest light intensity within the light intensity distribution of the diffracted light beam LD. However, in order to suppress the portion P having the highest light intensity $L_H$ within the light distribution pattern $PTN_L$ of the diffracted light beam LD from becoming excessively bright, it is preferable to be positioned to avoid the position having the highest light intensity $L_H$ within the light intensity distribution of the diffracted light beam LD.

Figure 14:
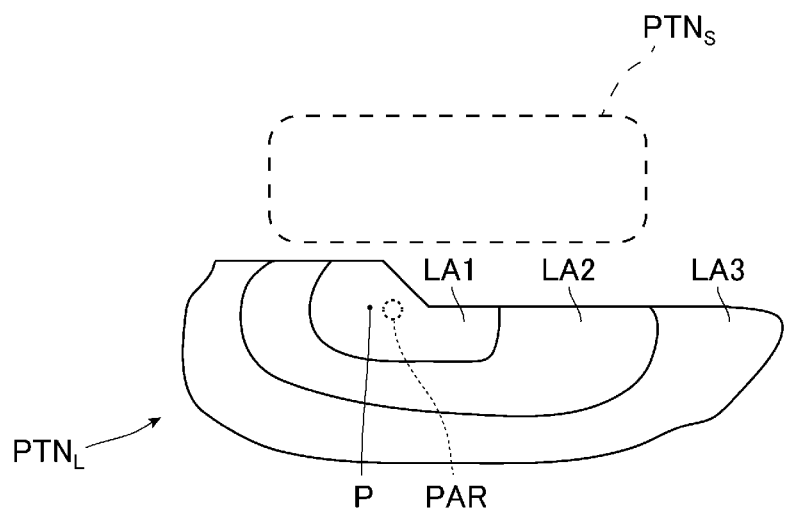
FIG. 14 is a figure showing a light distribution pattern of a low beam and a light distribution pattern of light for visually recognizing a sign.

In the fifth and sixth embodiments, the light distribution pattern $PTN_L$ of the low beam L is formed as a light distribution pattern for dark place illumination. However, it is not limited to a light distribution pattern $PTN_L$ of the low beam L, if it is a light distribution pattern for dark place illumination. Note that, a light distribution pattern for dark place illumination is used at night or in dark places such as tunnels. For example, as shown in FIG. 14, there are cases where the light distribution pattern $PTN_L$ of the low beam L, and a light distribution pattern $PTN_S$ of light for visually recognizing a sign positioned outside, for example, above this light distribution pattern $PTN_L$, are formed as a light distribution pattern for dark place illumination. In this case, it is preferable that light for visually recognizing a sign is included in high order diffracted light diffracted by the respective diffraction gratings 54R, 54G, and 54B. Moreover, for example, a light distribution pattern of a high beam may be formed as a light distribution pattern for dark place illumination.

Moreover, in the fifth and sixth embodiments, a headlight of an automobile is exemplified as the vehicle headlight 1. However, the fifth and sixth embodiments are not limited to a headlight of an automobile, and may be a headlight of another vehicle. Further, the fifth and sixth embodiments are not limited to a headlight, and may be a lamp such as a rear light, a tail light, a brake light, or an indicator light.

That is, the present invention exemplified in the fifth and sixth embodiments may be a vehicle illumination lamp such as follows. Namely, the vehicle illumination lamp includes a light source, and a diffraction grating that diffracts light incident from the light source. A light distribution pattern having a predetermined light intensity distribution is formed by light diffracted by the diffraction grating and light advancing and passing through the diffraction grating. A projection area of the light advancing and passing through the diffraction grating within this light distribution pattern is positioned within an area having a light intensity higher than half a value of a highest light intensity within a light intensity distribution of the light diffracted by the diffraction grating. It can be easily operated, if such a vehicle illumination lamp.

Seventh Embodiment

Next, a seventh embodiment of the present invention will be described. Note that, overlapping descriptions attached with the same reference numerals, except for particular descriptions, will be omitted for constituent elements the same or equivalent to those of the fifth embodiment. While the configuration of the vehicle headlight 1 in the present embodiment is the same as the configuration of the vehicle headlight 1 in the fifth embodiment, a light distribution pattern of light emitted by the vehicle headlight 1 of the present embodiment is different to a light distribution pattern of light emitted by the vehicle headlight 1 of the fifth embodiment.

The diffraction grating 54R of the present embodiment emits the laser light incident from the collimator lens 53R so as to have a predetermined light distribution pattern. Specifically, the diffraction grating 54R, in the synthesis optical system 55, emits laser light incident from the collimator lens 53R so that lights respectively emitted from the first light emitting optical system 51R, the second light emitting optical system 51G, and the third light emitting optical system 51B have a light distribution pattern of the diffracted light beam LD. A light intensity distribution is also included in this light distribution pattern. Accordingly, the diffraction grating 54R of the present embodiment emits laser light incident from the collimator lens 53R, so as to have a light intensity distribution based on a light intensity distribution of a light distribution pattern of the diffracted light beam LD, along with light diffracted by the diffraction grating 54R having a same external shape as an external shape of a light distribution pattern of the diffracted light beam LD.

This light diffracted by the diffraction grating 54R is high order diffracted light having an order of 1 or more, and in addition to this high order diffracted light, 0th-order light advancing and passing through the diffraction grating 54R without being diffracted is emitted from the diffraction grating 54R. In the present embodiment, 0th-order light is emitted from the diffraction grating 54R, so that the projection area of the 0th-order light beam LC emitted from the synthesis optical system 55 is positioned within a light distribution pattern of the low beam L formed by the 0th-order light beam LC and the diffracted light beam LD. The diffraction grating 54R of the present embodiment emits laser light incident from the collimator lens 53R, so that high order diffracted light diffracted by the diffraction grating 54R is unirradiated in the projection area of the 0th-order light beam LC. Therefore, in the projection area of the 0th-order light beam LC in the light distribution pattern of the low beam L, the light intensity of high order diffracted light diffracted by the diffraction grating 54R is zero.

In this way, a red component of high order diffracted light among the low beam L, and a red component of 0th-order light among the 0th-order light beam LC are emitted from the first light emitting optical system 51R. In the present embodiment, a red component of high order diffracted light emitted from the first light emitting optical system 51R is set as first light $LD_R$, and a red component of the 0th-order light is set as first 0th-order light $LC_R$.

The diffraction grating 54G emits laser light incident from the collimator lens 53G so as to have a predetermined light distribution pattern, and the diffraction grating 54B emits laser light incident from the collimator lens 53B so as to have a predetermined light distribution pattern. Specifically, the diffraction gratings 54G and 54B, in the synthesis optical system 55, respectively diffract laser light incident from the collimator lenses 53G and 53B so that lights respectively emitted from the first light emitting optical system 51R, the second light emitting optical system 51G, and the third light emitting optical system 51B have a light distribution pattern of the diffracted light beam LD. A light intensity distribution is also included in the light distribution pattern, such as described above. Accordingly, the diffraction gratings 54G and 54B of the present embodiment respectively diffract laser light incident from the collimator lenses 53G and 53B, so as to have a light intensity distribution based on a light intensity distribution of a light distribution pattern of the diffracted light beam LD, along with laser light respectively emitted from the diffraction gratings 54G and 54B having a same external shape as an external shape of a light distribution pattern of the diffracted light beam LD.

The light diffracted by this diffraction grating 54G is high order diffracted light having an order of 1 or more, and in addition to this high order diffracted light, 0th-order light advancing and passing through the diffraction grating 54G without being diffracted is emitted from the diffraction grating 54G. In the present embodiment, 0th-order light is emitted from the diffraction grating 54G, so that the projection area of the 0th-order light beam LC emitted from the synthesis optical system 55 is positioned within a light distribution pattern of the low beam L formed by the 0th-order light beam LC and the diffracted light beam LD. The diffraction grating 54G of the present embodiment emits laser light entering from the collimator lens 53G so that high order diffracted light diffracted by the diffraction grating 54G is unirradiated in the projection area of the 0th-order light beam LC. Therefore, in the projection area of the 0th-order light beam LC in the light distribution pattern of the low beam L, the light intensity of high order diffracted light diffracted by the diffraction grating 54G is zero.

Similarly, this light diffracted by the diffraction grating 54B is high order diffracted light having an order of 1 or more, and in addition to this high order diffracted light, 0th-order light advancing and passing through the diffraction grating 54B without being diffracted is emitted from the diffraction grating 54B. In the present embodiment, 0th-order light is emitted from the diffraction grating 54B, so that the projection area of the 0th-order light beam LC emitted from the synthesis optical system 55 is positioned within the light distribution pattern of the low beam L formed by the 0th-order light beam LC and the diffracted light beam LD. The diffraction grating 54B of the present embodiment emits laser light entering from the collimator lens 53B so that high order diffracted light diffracted by the diffraction grating 54B is unirradiated in the projection area of the 0th-order light beam LC. Therefore, in the projection area of the 0th-order light beam LC in the light distribution pattern of the low beam L, the light intensity of high order diffracted light diffracted by the diffraction grating 54B is zero.

In this way, a green component of high order diffracted light among the low beam L, and a green component of 0th-order light among the 0th-order light beam LC are emitted from the second light emitting optical system 51G. Moreover, a blue component of high order diffracted light among the low beam L, and a blue component of 0th-order light among the 0th-order light beam LC are emitted from the third light emitting optical system 51B. In the present embodiment, a green component of high order diffracted light emitted from the second light emitting optical system 51G is set as second light $LD_G$, a green component of 0th-order light is set as second 0th-order light $LC_G$, a blue component of high order diffracted light emitted from the third light emitting optical system 51B is set as third light $LD_B$, and a blue component of 0th-order light is set as third 0th-order light $LC_B$. Therefore, in the present embodiment, the first light $LD_R$ has a longest wavelength, and the wavelength becomes shorter in the order of the second light $LD_G$ and the third light $LD_B$. Similarly, the first 0th-order light $LC_R$ has a longest wavelength, and the wavelength becomes shorter in the order of the second 0th-order light $LC_G$ and the third 0th-order light $LC_B$.

Next, the emission of light by the vehicle headlight 1 of the present embodiment will be described.

First, by supplying power from a power source that is not illustrated, laser light is emitted from the respective light sources 52R, 52G, and 52B. As described above, red laser light is emitted from the light source 52R, green laser light is emitted from the light source 52G, and blue laser light is emitted from the light source 52B. The respective laser lights are collimated by collimator lenses 53R, 53G, and 53B, and afterwards are incident on the diffraction gratings 54R, 54G, and 54B. Then, as described above, the respective laser lights are diffracted by the diffraction gratings 54R, 54G, and 54B, the first light $LD_R$ that is a red component of the diffracted light beam LD is emitted from the first light emitting optical system 51R, the second light $LD_G$ that is a green component of the diffracted light beam LD is emitted from the second light emitting optical system 51G, and the third light $LD_B$ that is a blue component of the diffracted light beam LD is emitted from the third light emitting optical system 51B. Moreover, as described above, by respectively advancing and passing through the diffraction gratings 54R, 54G, and 54B, the first 0th-order light $LC_R$ that is a red component of the 0th-order light beam LC is emitted from the first light emitting optical system 51R, the second 0th-order light $LC_G$ that is a green component of the 0th-order light beam LC is emitted from the second light emitting optical system 51G, and the third 0th-order light $LC_B$ that is a blue component of the 0th-order light beam LC is emitted from the third light emitting optical system 51B.

In the synthesis optical system 55, first, the first light $LD_R$ and the second light $LD_G$ are synthesized and emitted by the first optical element 55f, and the first 0th-order light $LC_R$ and the second 0th-order light $LC_G$ are synthesized and emitted by the first optical element 55f. The first light $LD_R$ and the second light $LD_G$ synthesized by the first optical element 55f are synthesized with the third light $LD_B$ by the second optical element 55s, and the first 0th-order light $LC_R$ and the second 0th-order light $LC_G$ synthesized by the first optical element 55f are synthesized with the third 0th-order light $LC_B$ by the second optical element 55s. At this time, since the external shapes of the respective lights $LD_R$, $LD_G$, and $LD_B$ are the same as the external shape of the diffracted light beam LD, the external shapes of the respective lights $LD_R$, $LD_G$, and $LD_B$ will be synthesized by matching each other. In addition, since the external shapes of the respective 0th-order lights $LC_R$, $LC_G$, and $LC_B$ are also the same, the external shapes of the respective 0th-order lights $LC_R$, $LC_G$, and $LC_B$ will be synthesized by matching each other. Namely, the positions of each of the light emitting optical systems and the synthesis optical system are finely adjusted, so that the external shape of the first light $LD_R$, the external shape of the second light $LD_G$, and the external shape of the third light $LD_B$, and also the external shape of the first 0th-order light $LC_R$, the external shape of the second 0th-order light $LC_G$, and the external shape of the third 0th-order light $LC_B$, are combined by the synthesis optical system such as described above.

In this way, light in which the red first light $LD_R$, the green second light $LD_G$, and the blue third light $LD_B$ are synthesized becomes white, and this white light is emitted from the synthesis optical system 55 as the diffracted light beam LD. Moreover, light in which the red first 0th-order light $LC_R$, the green second 0th-order light $LC_G$, and the blue third 0th-order light $LC_B$ are synthesized becomes white, and this white light is emitted from the synthesis optical system 55 as the 0th-order light beam LC.

The diffracted light beam LD and the 0th-order light beam LC emitted from the synthesis optical system 55 are emitted from the opening 59H of the cover 59, and are emitted from the vehicle headlight 1 to the front of the vehicle via the front cover 12. A light distribution pattern of the low beam L is formed in front of the vehicle by the diffracted light beam LD and the 0th-order light beam LC.

Figure 15:
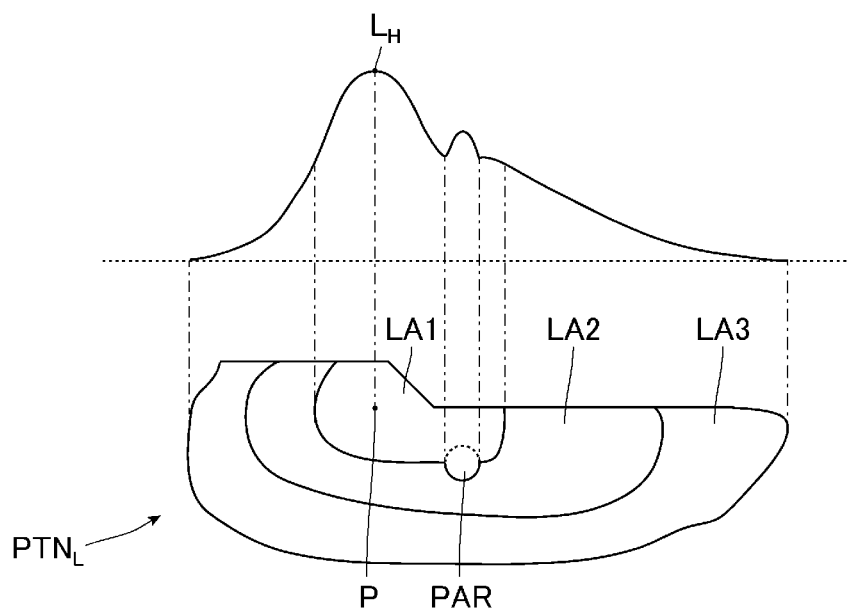
FIG. 15 is a figure showing a light distribution pattern of a low beam, and a light intensity distribution of this light distribution pattern.

FIG. 15 is a figure showing a light distribution pattern of a low beam, and a light intensity distribution of this light distribution pattern, of the present embodiment. As shown in FIG. 15, the light distribution pattern $PTN_L$ of the low beam L includes a first area LA1, a second area LA2, and a third area LA3, and the light intensity decreases in the order of the first area LA1, the second area LA2, and the third area LA3.

The first area LA1 is an area having a light intensity higher than a first light intensity threshold within a light intensity distribution of the diffracted light beam LD that is high order diffracted light, and in this first area LA1, a portion P is included that has a highest light intensity $L_H$ within a light intensity distribution of the diffracted light beam LD. The second area LA2 is an area having a light intensity equal to or less than the first light intensity threshold and higher than a second light intensity threshold set lower than the first light intensity threshold within a light intensity distribution of the diffracted light beam LD, and the third area LA3 is an area equal to or less than the second light intensity threshold within the light intensity distribution of the diffracted light beam LD. The first light intensity threshold is, for example, half a value of the highest light intensity $L_H$ within the light intensity distribution of the diffracted light beam LD.

Among such a light distribution pattern $PTN_L$ of the low beam L, a projection area PAR of 0th-order light on which is irradiated the 0th-order light beam LC is included within the second area LA2, and overlaps with a part of the first area LA1. Moreover, the light intensity of the projection area PAR of 0th-order light is made lower than a highest light intensity $L_H$ within the light intensity distribution of the diffracted light beam LD.

Figure 16:
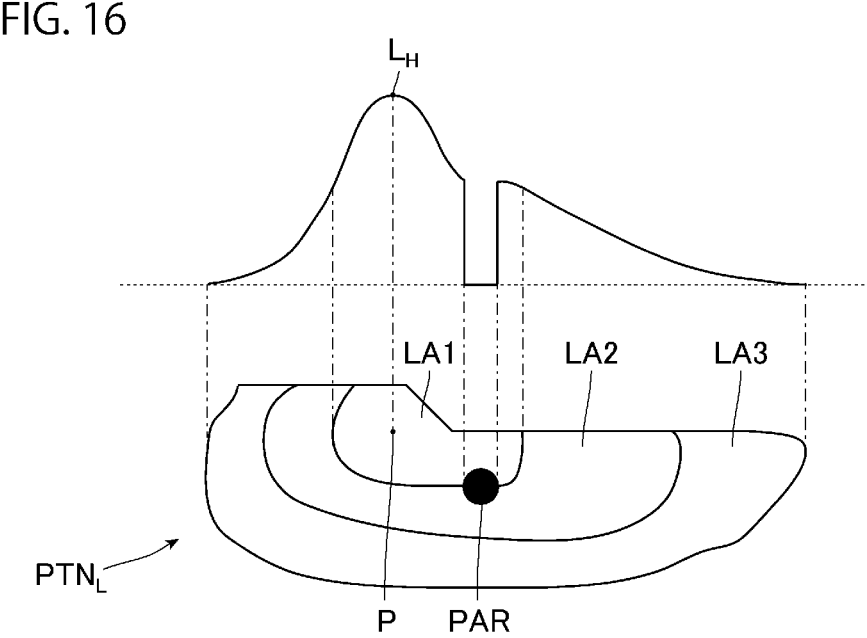
FIG. 16 is a figure showing a light distribution pattern of a low beam of the case where a 0th-order light beam is unirradiated, and a light intensity distribution of this light distribution pattern.

FIG. 16 is a figure showing a light distribution pattern of a low beam L of the case where the 0th-order light beam LC is unirradiated, and a light intensity distribution of this light distribution pattern. In the present embodiment such as described above, since the light intensity of high order diffracted light irradiated on the projection area PAR of 0th-order light is zero, in the case where the 0th-order light beam LC is unirradiated, such as shown in FIG. 16, the projection area PAR of the 0th-order light in the light distribution pattern $PTN_L$ of the low beam L will become a dark hole. By having the 0th-order light beam LC irradiated on the projection area PAR, the light distribution pattern $PTN_L$ of the low beam L shown in FIG. 15 is formed. Namely, while the light intensity of the projection area PAR is a total value of the light intensity of the diffracted light beam LD and the light intensity of the 0th-order light beam LC, in the present embodiment, since a light intensity of high order diffracted light irradiated on the projection area PAR is set as zero such as described above, the light intensity of the projection area PAR will match with the light intensity of the 0th-order light beam LC.

As described above, the vehicle headlight 1 of the present embodiment includes the light sources 52R, 52G, and 52B, and the diffraction gratings 54R, 54G, and 54B that diffract lights incident from the light sources 52R, 52G, and 52B.

Lights emitted from the diffraction gratings 54R, 54G, and 54B are synthesized by the synthesis optical system 55, and emitted from the synthesis optical system 55 as a diffracted light beam LD and a 0th-order light beam LC. A low beam L is obtained by the diffracted light beam LD and the 0th-order light beam LC, and the low beam L is irradiated in a light distribution pattern $PTN_L$ having a predetermined light intensity distribution. In the projection area PAR of 0th-order light in the light distribution pattern $PTN_L$, the diffracted light beam LD is unirradiated. As described above, the diffracted light beam LD is high order diffracted light diffracted by the diffraction gratings 54R, 54G, and 54B.

Therefore, a light intensity of high order diffracted light in the projection area PAR is smaller than a light intensity of light irradiated on an outside peripheral edge of the projection area PAR. Accordingly, it is possible to suppress the projection area PAR being noticeably bright within the light distribution pattern $PTN_L$ of the low beam L, even if 0th-order light having a high light intensity compared to a light intensity of high order diffracted light is irradiated on the projection area PAR. Therefore, the vehicle headlight 1 of the present embodiment can be operated more easily, compared to the case where a light intensity of high order diffracted light in the projection area PAR is equal to or more than a light intensity of light irradiated on an outside peripheral edge of the projection area PAR.

Note that, in the present embodiment, since the diffracted light beam LD is unirradiated on the projection area PAR such as described above, the light intensity of high order diffracted light irradiated on this projection area PAR will be zero. Therefore, in the present embodiment, even in the case where a difference between the light intensity of 0th-order light and the light intensity of high order diffracted light is large, it will be easy to suppress the projection area PAR being noticeably bright within the light distribution pattern $PTN_L$ of the low beam L, and to form a smooth light intensity distribution as the whole light distribution pattern $PTN_L$.

As described above, since the light intensity of high order diffracted light irradiated on the projection area PAR is set as zero, the light intensity of the projection area PAR will become the light intensity of 0th-order light. This light intensity of 0th-order light, such as shown in FIG. 15, is lower than the highest light intensity $L_H$ within the light intensity distribution of the diffracted light beam LD that is high order diffracted light. Therefore, in the present embodiment, it will be easy for the light intensity distribution of the light distribution pattern $PTN_L$ to be smoothly formed, on the basis of the portion P having the highest light intensity $L_H$ within the light intensity distribution of the high order diffracted light.

In addition, in the case of the present embodiment, the light distribution pattern $PTN_L$ of the low beam L includes a first area LA1, a second area LA2 having a light intensity lower than a light intensity of the first area LA1, and a third area LA3 having a light intensity lower than a light intensity of the second area LA2. The projection area PAR is included within the second area LA2, and a part of the projection area PAR overlaps with the first area LA1. Therefore, it is possible to suppress the projection area PAR being noticeably bright within the light distribution pattern $PTN_L$ of the low beam L, compared to the case where the projection area PAR is included in the third area LA3, which is an area with a lowest light intensity within the light distribution pattern $PTN_L$ of the low beam L.

Moreover, the vehicle headlight 1 of the present embodiment has a plurality of light emitting optical systems including one light source and one diffraction grating. Namely, the vehicle headlight 1 has a first light emitting optical system 51R including one light source 52R and one diffraction grating 54R, a second light emitting optical system 51G including one light source 52G and one diffraction grating 54G, and a third light emitting optical system 51B including one light source 52B and one diffraction grating 54B. In addition to this, the vehicle headlight 1 of the present embodiment further includes a synthesis optical system 55 that synthesizes lights emitted from the respective light emitting optical systems 51R, 51G, and 51B. Also, the respective light sources 52R, 52G, and 52B emit light of mutually different predetermined wavelengths, and the respective diffraction gratings 54R, 54G, and 54B emit light from the light sources 52R, 52G, and 52B so that light synthesized by the synthesis optical system 55 has the light distribution pattern of the low beam L.

In this case, lights of predetermined wavelengths emitted from the respective light sources 52R, 52G, and 52B are diffracted by the diffraction gratings 54R, 54G, and 54B, and a light distribution pattern is formed. At this time, in the respective light emitting optical systems 51R, 51G, and 51B, since light diffracted by the diffraction gratings 54R, 54G, and 54B has a predetermined wavelength, it is possible to suppress color bleeding from occurring near edges of a light distribution pattern in the lights emitted from the respective diffraction gratings 54R, 54G, and 54B, even if the diffraction gratings 54R, 54G, and 54B have a wavelength dependency. In this way, light having a light distribution pattern in which color bleeding is suppressed is synthesized by the synthesis optical system 55, and the light distribution pattern of the low beam L is formed. Therefore, the low beam L irradiated by the vehicle headlight 1 of the present embodiment can suppress color bleeding from appearing near edges of a light distribution pattern.

Moreover, in the vehicle headlight 1 of the present embodiment, the 0th-order lights $LC_R$, $LC_G$, and $LC_B$ advancing and passing through the respective diffraction gratings 54R, 54G, and 54B are synthesized by the synthesis optical system 55, and are irradiated on the projection area PAR. In this case, even if the diffraction gratings 54R, 54G, and 54B have a wavelength dependency such as described above, the 0th-order lights $LC_R$, $LC_G$, and $LC_B$ passing through the respective diffraction gratings 54R, 54G, and 54B can be made a same white color. Therefore, in the vehicle headlight 1 of the present embodiment, it is possible to reduce a driver from being unnecessarily aware of the projection area PAR, and it becomes easier to operate.

Eighth Embodiment

Next, an eighth embodiment of the present invention will be described. Note that, overlapping descriptions attached with the same reference numerals, except for particular descriptions, will be omitted for constituent elements the same or equivalent to those of the seventh embodiment.

Since the figure showing an optical system unit of a vehicle headlight according to the present embodiment is described similar to that of FIG. 13, the present embodiment will be described with reference to FIG. 13. As shown in FIG. 13, the optical system unit 50 of the vehicle headlight of the present embodiment is different to the optical system unit 50 of the seventh embodiment for the point of not including the synthesis optical system 55, and emitting the respective lights emitted from the first light emitting optical system 51R, the second light emitting optical system 51G, and the third light emitting optical system 51B from the cover 59, in a state where not synthesized. In the present embodiment, the first light emitting optical system 51R, the second light emitting optical system 51G, and the third light emitting optical system 51B have an irradiation direction of light on an opening 59H side of the cover 59.

In the present embodiment, similar to the seventh embodiment, in the diffraction grating 54R of the first light emitting optical system 51R, the diffraction grating 54G of the second light emitting optical system 51G, and the diffraction grating 54B of the third light emitting optical system 51B, respectively, light is emitted so that synthesized light forms a light distribution pattern of the low beam L.

Namely, the first light $LD_R$ emitted from the diffraction grating 54R, the second light $LD_G$ emitted from the diffraction grating 54G, and the third light $LD_B$ emitted from the diffraction grating 54B are respectively emitted from the opening 59H of the cover 59, and irradiated to the outside of the vehicle headlight via the front cover 12. Moreover, the first 0th-order light $LC_R$ emitted from the diffraction grating 54R, the second 0th-order light $LC_G$ emitted from the diffraction grating 54G, and the third 0th-order light $LC_B$ emitted from the diffraction grating 54B are respectively emitted from the opening 59H of the cover 59, and irradiated to the outside of the vehicle headlight via the front cover 12. At this time, the first light $LD_R$, the second light $LD_G$, and the third light $LD_B$, and also the first 0th-order light $LC_R$, the second 0th-order light $LC_G$, and the third 0th-order light $LC_B$, are irradiated so that the external shapes of the respective light distribution patterns substantially match each other at a focal position separated a predetermined distance from the vehicle. This distance from the vehicle is, for example, 25 m. Accordingly, the light distribution pattern of the low beam L is formed at a position separated a predetermined distance from the vehicle. This light distribution pattern is the light distribution pattern $PTN_L$ shown in FIG. 15, and has a same light intensity distribution as the light intensity distribution shown in FIG. 15. Accordingly, similar to the seventh embodiment, the diffracted light beam LD is unirradiated in the projection area PAR of 0th-order light, and a light intensity of high order diffracted light in the projection area PAR is smaller than a light intensity of light irradiated on an outside peripheral edge of the projection area PAR.

According to the vehicle headlight of the present embodiment, since the synthesis optical system 55 of the seventh embodiment is not used, it is possible to form a simple configuration. Moreover, according to the vehicle headlight of the present embodiment, since a light intensity of high order diffracted light in the projection area PAR is smaller than a light intensity of light irradiated on an outside peripheral edge of the projection area PAR, similar to the seventh embodiment, it is possible to suppress the projection area PAR being noticeably bright within the light distribution pattern $PTN_L$. Note that, the external shape of the first light $LD_R$, the external shape of the second light $LD_G$, and the external shape of the third light $LD_B$, and also the external shape of the first 0th-order light $LC_R$, the external shape of the second 0th-order light $LC_G$, and the external shape of the third 0th-order light $LC_B$, of the present embodiment tend to slightly deviate from each other except for at the focal position. However, when compared with light obtained by having white light incident on one diffraction grating, it is possible to suppress this deviation of the external shapes. Therefore, according to the present embodiment, a vehicle headlight can be realized that is capable of suppressing color bleeding while being reduced in size.

Note that, in the seventh and eighth embodiments, the first light emitting optical system that emits a red component of the first light $LD_R$, the second light emitting optical system that emits a green component of the second light $LD_G$, and the third light emitting optical system that emits a blue component of the third light $LD_B$, are included. However, in the vehicle headlight of the seventh and eighth embodiments, the lights emitted from the light sources respectively included in the three light emitting optical systems are not limited to red, green, and blue, as long as they have respectively different predetermined wavelengths.

Moreover, the number of light emitting optical systems may be one or two. In addition, the number of light emitting optical systems may be three or more. In this case, for example, a fourth light emitting optical system that emits a yellow component of light of the low beam L may be provided. In this case, in addition to the red, green, and blue light emitting optical systems, the fourth light emitting optical system may emit a yellow component of light of the low beam L. Moreover, in the case where a light intensity of a part of red, green, and blue is low, the fourth light emitting optical system may emit a color component of light the same as the color with a low light intensity.

Moreover, in the seventh and eighth embodiments, a white balance adjustment circuit may be further provided. This white balance adjustment circuit can achieve a desired white balance, by controlling a total light flux amount of light emitted from the light source 52R of the first light emitting optical system 51R, a total light flux amount of light emitted from the light source 52G of the second light emitting optical system 51G, and a total light flux amount of light emitted from the light source 52B of the third light emitting optical system 51B. For example, it may be possible to perform switching, so as to emit warm white light or to emit blue white light, within the scope of the law.

Moreover, in the seventh embodiment, the first optical element 55f synthesizes the first light $LD_R$ and the second light $LD_G$ by transmitting the first light $LD_R$ first light and reflecting the second light $LD_G$, and the second optical element 55s synthesizes the first light $LD_R$, the second light $LD_G$, and the third light $LD_B$ by transmitting the first light $LD_R$ and the second light $LD_G$ synthesized by the first optical element 55f and reflecting the third light $LD_B$. However, for example, it may have a configuration where the third light $LD_B$ and the second light $LD_G$ are synthesized in the first optical element 55f, and the third light $LD_B$ and the second light $LD_G$ synthesized by the first optical element 55f and the first light $LD_R$ are synthesized in the second optical element 55s. In this case, the positions of the first light emitting optical system 51R and the third light emitting optical system 51B of the seventh embodiment are switched. Moreover, in this case, it will have a configuration where the third 0th-order light $LC_B$ and the second 0th-order light $LC_G$ are synthesized in the first optical element 55f, and the third 0th-order light $LC_B$ and the second 0th-order light $LC_G$ synthesized by the first optical element 55f and the first 0th-order light $LC_R$ are synthesized in the second optical element 55s. In the seventh embodiment, a band pass filter that transmits light of a predetermined wavelength band and reflects light of other wavelength bands may be used in the first optical element 55f or the second optical element 55s. The synthesis optical system 55 may combine and synthesize external shapes of lights emitted from the respective light emitting optical systems, and is not limited to the above embodiment.

Moreover, in the seventh and eighth embodiments, high order diffracted light diffracted by the diffraction gratings 54R, 54G, and 54B and emitted from the diffraction gratings 54R, 54G, and 54B is unirradiated on the projection area PAR, and a light intensity of high order diffracted light is set as zero in this projection area PAR. However, a light intensity of high order diffracted light irradiated on the projection area PAR may be greater than zero, as long as a light intensity of high order diffracted light irradiated on the projection area PAR is smaller than a light intensity of light irradiated on an outside peripheral edge of the projection area PAR.

Moreover, in the seventh embodiment, the 0th-order lights $LC_R$, $LC_G$, and $LC_B$ advancing and passing through the respective diffraction gratings 54R, 54G, and 54B may not be synthesized by the synthesis optical system 55, and may be irradiated on different areas of the projection area PAR. However, as described above, in order to reduce a driver or the like from being unnecessarily aware of the projection area PAR, it is preferable that the 0th-order lights $LC_R$, $LC_G$, and $LC_B$ advancing and passing through the respective diffraction gratings 54R, 54G, 54B are synthesized.

Moreover, in the seventh and eighth embodiments, while the projection area PAR overlaps with a part of the first area LA1, it may be included within the first area LA1. Moreover, while the projection area PAR does not include a position having the highest light intensity $L_H$ within the light intensity distribution of high order diffracted light, it may include this position. In this case, the brightest area within the light distribution pattern $PTN_L$ of the low beam L will be mostly unchanged, regardless of whether or not the light intensity of the 0th-order light is large. Accordingly, the light intensity distribution of the light distribution pattern $PTN_L$ of the low beam L can be more smoothly formed, on the basis of a position having a highest light intensity within the light intensity distribution of high order diffracted light.

In the seventh and eighth embodiments, the light intensity of the projection area PAR is lower than the highest light intensity $L_H$ within the light intensity distribution of high order diffracted light. However, the light intensity of the projection area PAR may be equal to or more than the highest light intensity $L_H$ within the light intensity distribution of high order diffracted light. In this case, it is preferable that the projection area PAR is included within the first area LA1, and it is more preferable that the projection area PAR is included at a position having the highest light intensity $L_H$ within the light intensity distribution of high order diffracted light.

In the seventh and eighth embodiments, the light distribution pattern $PTN_L$ of the low beam L is formed as a light distribution pattern for dark place illumination. However, it is not limited to a light distribution pattern $PTN_L$ of the low beam L, if it is a light distribution pattern for dark place illumination. Note that, a light distribution pattern for dark place illumination is used at night or in dark places such as tunnels. For example, there are cases where a light distribution pattern of the low beam L, and a light distribution pattern of light for visually recognizing a sign positioned outside, for example, above this light distribution pattern, are formed as a light distribution pattern for dark place illumination. In this case, it is preferable that light for visually recognizing a sign is included in high order diffracted light diffracted by the respective diffraction gratings 54R, 54G, and 54B. Moreover, for example, a light distribution pattern of a high beam may be formed as a light distribution pattern for dark place illumination.

Moreover, in the seventh and eighth embodiments, a headlight of an automobile is exemplified as the vehicle headlight 1. However, the seventh and eighth embodiments are not limited to a headlight of an automobile, and may be a headlight of another vehicle. Further, the seventh and eighth embodiments are not limited to a headlight, and may be a lamp such as a rear light, a tail light, a brake light, or an indicator light.

That is, the present invention exemplified in the seventh and eighth embodiments may be a vehicle illumination lamp such as follows. Namely, the vehicle illumination lamp includes a light source, and a diffraction grating that diffracts light incident from the light source. Light emitted from the diffraction grating is irradiated in a light distribution pattern having a predetermined light intensity distribution. Also, in the projection area of light advancing and passing through the diffraction grating among the light distribution pattern, a light intensity of light diffracted by the diffraction grating and irradiated on the projection area is smaller than a light intensity of light irradiated on an outside peripheral edge of the projection area. It can be easily operated, if such a vehicle illumination lamp.

Ninth Embodiment

Figure 17:
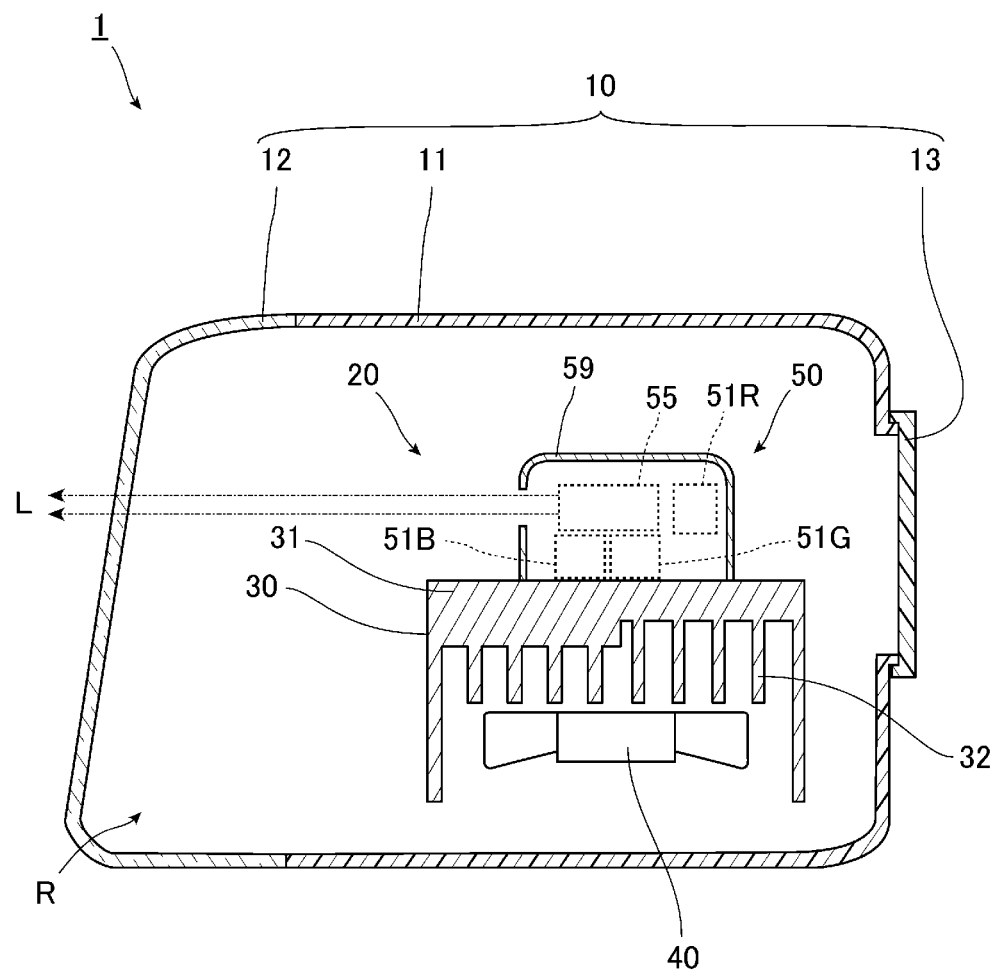
FIG. 17 is a cross-sectional view schematically showing a vehicle that includes a vehicle headlight according to a ninth embodiment of the present invention.
Figure 18:
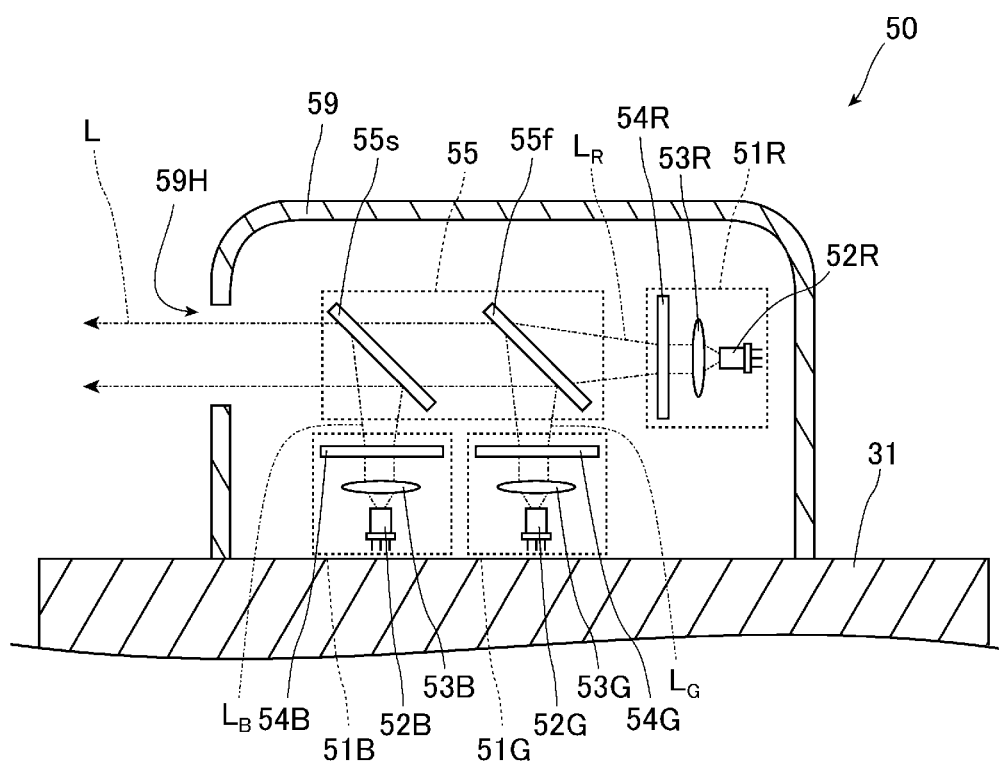
FIG. 18 is an enlarged view of an optical system unit of FIG. 17.

Next, a ninth embodiment of the present invention will be described. Note that, overlapping descriptions attached with the same reference numerals, except for particular descriptions, will be omitted for constituent elements the same or equivalent to those of the first embodiment. FIG. 17 is a cross-sectional view schematically showing a vehicle that includes a vehicle headlight according to the present embodiment. FIG. 18 is an enlarged view of an optical system unit 50 of a vehicle headlight 1 shown in FIG. 17. As shown in FIGS. 17 and 18, while the configuration of the vehicle headlight 1 in the present embodiment is the same as the configuration of the vehicle headlight 1 in the first embodiment, a light distribution pattern of light emitted by the vehicle headlight 1 of the present embodiment is different to a light distribution pattern of light emitted by the vehicle headlight 1 of the first embodiment.

The diffraction grating 54R of the present embodiment diffracts laser light emitted from the collimator lens 53R so as to have a predetermined light distribution pattern. Specifically, the diffraction grating 54R, in the synthesis optical system 55 described later, diffracts laser light incident from the collimator lens 53R so that lights respectively emitted from the first light emitting optical system 51R, the second light emitting optical system 51G, and the third light emitting optical system 51B have a light distribution pattern of a low beam. A light intensity distribution is also included in this light distribution pattern. Accordingly, the diffraction grating 54R of the present embodiment diffracts laser light incident from the collimator lens 53R, so as to have a light intensity distribution based on a light intensity distribution of a light distribution pattern of the low beam L, along with laser light emitted from the diffraction grating 54R having a same external shape as an external shape of a light distribution pattern of the low beam L. In this way, a red component of light of a light distribution pattern of the low beam L is emitted from the first light emitting optical system 51R. In the present embodiment, a red component of light emitted from the first light emitting optical system 51R is set as first light $L_R$.

The diffraction grating 54G diffracts laser light emitted from the collimator lens 53G so as to have a predetermined light distribution pattern, and the diffraction grating 54B diffracts laser light emitted from the collimator lens 53B so as to have a predetermined light distribution pattern. Specifically, the diffraction gratings 54G and 54B, in the synthesis optical system 55, respectively diffract laser light incident from the collimator lenses 53G and 53B so that lights respectively emitted from the first light emitting optical system 51R, the second light emitting optical system 51G, and the third light emitting optical system 51B have a light distribution pattern of the low beam L. A light intensity distribution is also included in the light distribution pattern, such as described above. Accordingly, the diffraction gratings 54G and 54B of the present embodiment respectively diffract laser light incident from the collimator lenses 53G and 53B, so as to have a light intensity distribution based on a light intensity distribution of a light distribution pattern of the low beam L, along with laser light respectively emitted from the diffraction gratings 54G and 54B having a same external shape as an external shape of a light distribution pattern of the low beam L. In this way, a green component of light of a light distribution pattern of the low beam L is emitted from the second light emitting optical system 51G, and a blue component of light of a light distribution pattern of the low beam L is emitted from the third light emitting optical system 51B. In the present embodiment, a green component of light emitted from the second light emitting optical system 51G is set as second light $L_G$, and a blue component of light emitted from the third light emitting optical system 51B is set as third light $L_B$. Therefore, in the present embodiment, the first light $L_R$ has a longest wavelength, and the wavelength becomes shorter in the order of the second light $L_G$ and the third light $L_B$.

The synthesis optical system 55 includes a first optical element 55f and a second optical element 55s. The first optical element 55f is an optical element that synthesizes the first light $L_R$ emitted from the first light emitting optical system 51R and the second light $L_G$ emitted from the second light emitting optical system 51G. In the present embodiment, the first optical element 55f synthesizes the first light $L_R$ and the second light $L_G$ by transmitting the first light $L_R$ and reflecting the second light $L_G$. Moreover, the second optical element 55s is an optical element that synthesizes the first light $L_R$ and the second light $L_G$ synthesized by the first optical element 55f and the third light $L_B$ emitted from the third light emitting optical system 51B. In the present embodiment, the second optical element 55s synthesizes the first light $L_R$, the second light $L_G$, and the third light $L_B$ by transmitting the first light $L_R$ and the second light $L_G$ synthesized by the first optical element 55f and reflecting the third light $L_B$. An optical filter, in which an oxide film is layered on a glass substrate, can be included as such a first optical element 55f and second optical element 55s. By controlling the type and thickness of this oxide film, it is possible to form a configuration that transmits light having a wavelength longer than a predetermined wavelength, and reflects light having a wavelength shorter than this wavelength.

In this way, light in which the first light $L_R$, the second light $L_G$, and the third light $L_B$ are synthesized is emitted from the synthesis optical system 55.

Next, the emission of light by the vehicle headlight 1 of the present embodiment will be described.

First, by supplying power from a power source that is not illustrated, laser light is emitted from the respective light sources 52R, 52G, and 52B. As described above, red laser light is emitted from the light source 52R, green laser light is emitted from the light source 52G, and blue laser light is emitted from the light source 52B. The respective laser lights are collimated by collimator lenses 53R, 53G, and 53B, and afterwards are incident on the diffraction gratings 54R, 54G, and 54B. Then, as described above, the respective laser lights are diffracted by the diffraction gratings 54R, 54G, and 54B, the first light $L_R$ that is a red component of light of a light distribution pattern of the low beam L is emitted from the first light emitting optical system 51R, the second light $L_G$ that is a green component of light of a light distribution pattern of the low beam L is emitted from the second light emitting optical system 51G, and the third light $L_B$ that is a blue component of light of a light distribution pattern of the low beam L is emitted from the third light emitting optical system 51B.

In the synthesis optical system 55, first, the first light $L_R$ and the second light $L_G$ are synthesized and emitted by the first optical element 55f. The first light $L_R$ and the second light $L_G$ synthesized by the first optical element 55f are synthesized with the third light $L_B$ by the second optical element 55s. At this time, since the respective lights have an external shape the same as the external shape of the low beam L, the external shapes of the respective lights will be synthesized by matching each other. Namely, the positions of each of the light emitting optical systems and the synthesis optical system are finely adjusted, so that the external shape of the first light $L_R$, the external shape of the second light $L_G$, and the external shape of the third light $L_B$ are combined by the synthesis optical system such as described above. In this way, light in which the red first light $L_R$, the green second light $L_G$, and the blue third light $L_B$ are synthesized becomes white light. Moreover, since the first light $L_R$, the second light $L_G$, and the third light $L_B$ are light intensity distributions based on a light intensity distribution of a light distribution pattern of the low beam L such as described above, white light in which these lights are synthesized will become a light intensity distribution of the low beam L.

In this way, synthesized white light is emitted from the opening 59H of the cover 59, and this light is emitted from the vehicle headlight 1 via the front cover 12. Since this light has a light distribution pattern of the low beam L, the irradiated light becomes the low beam L.

Figure 19A:
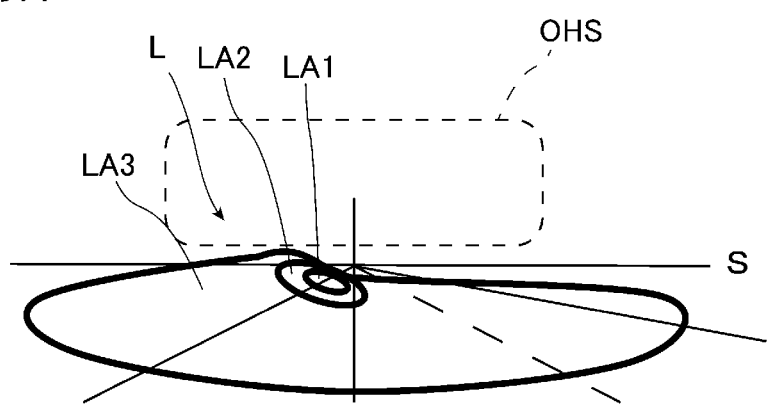
FIG. 19A and FIG. 19B are figures showing a light distribution pattern.
Figure 19B:
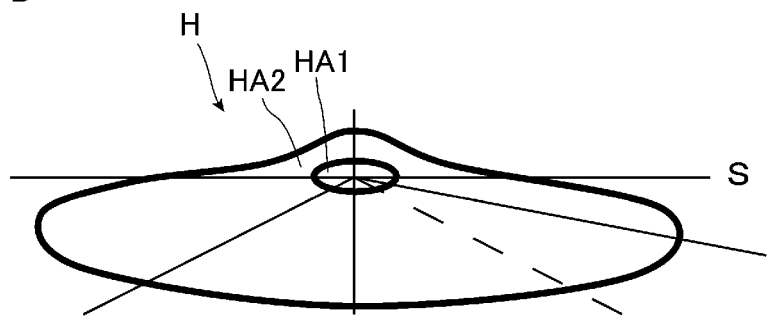

FIG. 19A and FIG. 19B are diagrams showing a light distribution pattern for night illumination in the present embodiment, specifically, FIG. 19A is a figure showing a light distribution pattern of a low beam, and FIG. 19B is a figure of a light distribution pattern of a high beam. In FIG. 19A and FIG. 19B, S shows a horizontal line, and a light distribution pattern is shown by a bold line. Among a light distribution pattern of the low beam L that is a light distribution pattern for night illumination shown in FIG. 19A, an area LA1 is an area having a highest light intensity, and the light intensity decreases in the order of an area LA2, and an area LA3. Namely, the respective diffraction gratings 54R, 54G, and 54B diffract light so that synthesized light forms a light distribution pattern including a light intensity distribution of the low beam L. Note that, as shown by a broken line in FIG. 19A and FIG. 19B, light having a light intensity lower than that of the low beam L may be irradiated from the vehicle headlight 1 to above a position where the low beam L is irradiated. This light is used as light OHS for visually recognizing a sign. In this case, it is preferable that this light OHS for visually recognizing a sign is included in the diffracted light emitted from the respective diffraction gratings 54R, 54G, and 54B. Moreover, in this case, it can be understood that a light distribution pattern for night illumination is formed by the low beam L and the light OHS for visually recognizing a sign. Note that, a light distribution pattern for night illumination is not only used at night, but is also used in a dark place such as a tunnel.

Incidentally, white reference light from the light source is incident on the hologram element of the vehicle headlight of Patent Document 1, and a light distribution pattern of a low beam is formed by this diffracted light. However, white light is light obtained by synthesizing light of a plurality of wavelengths. Incidentally, a hologram element, which is one type of diffraction grating, has a wavelength dependency. Therefore, light of mutually different wavelengths included in white tends to have mutually different light distribution patterns depending on the hologram element. Accordingly, in the case where a low beam is irradiated by the vehicle headlight described in Patent Document 1, light bleeding from which lights of different colors emerges will occur near edges of a light distribution pattern of the low beam. Accordingly, there is a demand to suppress color bleeding while reducing the size.

Accordingly, the vehicle headlight 1 of the present embodiment includes three of a first light emitting optical system 51R, a second light emitting optical system 51G, and a third light emitting optical system 51B having light sources 52R, 52G, and 52B and diffraction gratings 54R, 54G, and 54B, and a synthesis optical system 55 that synthesizes light emitted from the respective light emitting optical systems. The light sources 52R, 52G, and 52B in the respective light emitting optical systems emit light of mutually different predetermined wavelengths, and the diffraction gratings 54R, 54G, and 54B in the respective light emitting optical systems diffract light from each of the light sources 52R, 52G, and 52B so that light synthesized by the synthesis optical system 55 has a light distribution pattern of the low beam L.

Therefore, since the vehicle headlight 1 of the present embodiment can form a light distribution pattern of the low beam L without using a shade, it is possible to reduce in size compared to a vehicle headlight using a shade. Moreover, in the respective light emitting optical systems, light of a predetermined wavelength emitted from the light sources 52R, 52G, and 52B is separately diffracted by the diffraction gratings 54R, 54G, and 54B, and a light distribution pattern is formed. At this time, in the respective light emitting optical systems, since light diffracted by the diffraction gratings 54R, 54G, and 54B has a predetermined wavelength such as described above, it is possible to suppress color bleeding from occurring near edges of a light distribution pattern in the lights emitted from the respective diffraction gratings 54R, 54G, and 54B, even if the diffraction gratings 54R, 54G, and 54B have a wavelength dependency. In this way, light having a light distribution pattern in which color bleeding is suppressed is synthesized by the synthesis optical system 55, and the light distribution pattern of the low beam L is formed. Therefore, the low beam L irradiated by the vehicle headlight 1 of the present embodiment can suppress color bleeding from appearing near edges of a light distribution pattern. Moreover, in the present embodiment, since there are three light emitting optical systems that emit light of mutually different wavelengths, light of a desired color can be emitted, by adjusting the light intensity of light emitted from the respective light emitting optical systems.

Moreover, the vehicle headlight 1 of the present embodiment has the respective lights emitted from the first light emitting optical system 51R, the second light emitting optical system 51G, and the third light emitting optical system 51B synthesized by the synthesis optical system 55, and the synthesized light is emitted from the vehicle headlight 1. Accordingly, it is possible to suppress color bleeding from occurring near edges of a light distribution pattern irradiated regardless of a distance from the vehicle, more than the case where the respective lights emitted from the first light emitting optical system 51R, the second light emitting optical system 51G, and the third light emitting optical system 51B are separately emitted from the vehicle headlight 1, and synthesized outside the vehicle headlight 1. Moreover, since lights emitted from the respective light emitting optical systems are synthesized by the synthesis optical system 55, and then emitted from the vehicle headlight, the emission portion of light of the vehicle headlight 1 can be made small, and the degree of freedom of the design can be improved.

Tenth Embodiment

Next, a tenth embodiment of the present invention will be described in detail with reference to FIG. 20. Note that, overlapping descriptions attached with the same reference numerals, except for particular descriptions, will be omitted for constituent elements the same or equivalent to those of the ninth embodiment.

FIG. 20 is a figure showing, similar to FIG. 18, an optical system unit of a vehicle headlight according to the present embodiment. As shown in FIG. 20, the optical system unit 50 of the vehicle headlight of the present embodiment is different to the optical system unit 50 of the ninth embodiment for the point of not including the synthesis optical system 55, and emitting the respective lights emitted from the first light emitting optical system 51R, the second light emitting optical system 51G, and the third light emitting optical system 51B from the cover 59, in a state where not synthesized. In the present embodiment, the first light emitting optical system 51R, the second light emitting optical system 51G, and the third light emitting optical system 51B have an irradiation direction of light on an opening 59H side of the cover 59.

In the present embodiment, similar to the ninth embodiment, in the diffraction grating 54R of the first light emitting optical system 51R, the diffraction grating 54G of the second light emitting optical system 51G, and the diffraction grating 54B of the third light emitting optical system 51B, respectively, light is diffracted so that synthesized light forms a light distribution pattern of the low beam L. The first light $L_R$ emitted from the diffraction grating 54R, the second light $L_G$ emitted from the diffraction grating 54G, and the third light $L_B$ emitted from the diffraction grating 54B are respectively emitted from the opening 59H of the cover 59, and irradiated to the outside of the vehicle headlight via the front cover 12. At this time, the first light $L_R$, the second light $L_G$, and the third light $L_B$ are irradiated so that the external shapes of the respective light distribution patterns substantially match each other at a focal position separated a predetermined distance from the vehicle. This focal position is, for example, a position 25 m away from the vehicle. Namely, in the present embodiment, the irradiation directions of light of the first light emitting optical system 51R, the second light emitting optical system 51G, and the third light emitting optical system 51B are finely adjusted, so that the external shapes match each other such as described above. Note that, in the present embodiment, as shown by a broken line in FIG. 19A, light OHS for visually recognizing a sign may be emitted. In this case, similar to the ninth embodiment, it is preferable that this light OHS for visually recognizing a sign is included in the diffracted light emitted from the respective diffraction gratings 54R, 54G, and 54B.

According to the vehicle headlight of the present embodiment, since the synthesis optical system 55 of the ninth embodiment is not used, it is possible to form a simple configuration. Note that, the external shape of the first light $L_R$, the external shape of the second light $L_G$, and the external shape of the third light $L_B$ of the present embodiment tend to slightly deviate from each other except for at the focal position. However, when compared with diffracted light obtained by having white light incident on one diffraction grating, it is possible to suppress this deviation of the external shapes. Therefore, according to the present embodiment, a vehicle headlight can be realized that is capable of suppressing color bleeding while being reduced in size.

Note that, in the ninth and tenth embodiments, while the low beam L is emitted from the vehicle headlight 1, the ninth and tenth embodiments are not limited to this if light for night illumination is emitted. For example, a high beam H may be emitted from the vehicle headlight 1. In this case, light of a light distribution pattern of the high beam H, which is the light distribution pattern for night illumination shown in FIG. 19B, is irradiated. Note that, among the light distribution pattern of the high beam H in FIG. 19B, an area HA1 is an area having a highest light intensity, and an area HA2 is an area having a light intensity lower than that of the area HA1. Namely, the respective diffraction gratings diffract light so that synthesized light forms a light distribution pattern including the light intensity distribution of the high beam H.

Moreover, in the ninth and tenth embodiments, the first light emitting optical system that emits a red component of the first light $L_R$, the second light emitting optical system that emits a green component of the second light $L_G$, and the third light emitting optical system that emits a blue component of the third light $L_B$, are included. However, in the vehicle headlight of the ninth and tenth embodiments, at least two light emitting optical systems have light sources that respectively emit light of mutually different predetermined wavelengths, and the number of light emitting optical systems and the lights emitted from the light sources will not be limited, as long as the synthesized light becomes a light distribution pattern for night illumination. For example, in the case where there are two light emitting optical systems, there may be yellow light of night illumination, by having one light emitting optical system emit green light and the other light emitting optical system emit red light, or there may be white light of night illumination, by having one light emitting optical system emit blue light and the other light emitting optical system emit yellow light.

Moreover, the number of light emitting optical systems may be three or more. In this case, for example, a fourth light emitting optical system that emits a yellow component of light of the low beam L may be provided. For example, in addition to the red, green, and blue light emitting optical systems, the fourth light emitting optical system may emit a yellow component of light of the low beam L. Moreover, in the case where a light intensity of a part of red, green, and blue is low, the fourth light emitting optical system may emit a color component of light the same as the color with a low light intensity.

Moreover, in the ninth and tenth embodiments, a white balance adjustment circuit may be further provided. This white balance adjustment circuit can achieve a desired white balance, by controlling a total light flux amount of light emitted from the light source 52R of the first light emitting optical system 51R, a total light flux amount of light emitted from the light source 52G of the second light emitting optical system 51G, and a total light flux amount of light emitted from the light source 52B of the third light emitting optical system 51B. For example, it may be possible to perform switching, so as to emit warm white light, or to emit blue white light, within the scope of the law.

Moreover, in the ninth embodiment, the first optical element 55$f$ synthesizes the first light $L_R$ and the second light $L_G$ by transmitting the first light $L_R$ first light and reflecting the second light $L_G$, and the second optical element 55$s$ synthesizes the first light $L_R$, the second light $L_G$, and the third light $L_B$ by transmitting the first light $L_R$ and the second light $L_G$ synthesized by the first optical element 55$f$ and reflecting the third light $L_B$. However, for example, it may have a configuration where the third light $L_B$ and the second light $L_G$ are synthesized in the first optical element 55$f$, and the third light $L_B$ and the second light $L_G$ synthesized by the first optical element 55$f$ and the first light $L_R$ are synthesized in the second optical element 55$s$. In this case, the positions of the first light emitting optical system 51R and the third light emitting optical system 51B of the ninth embodiment are switched. Moreover, in the ninth embodiment, a band pass filter that transmits light of a predetermined wavelength band and reflects light of other wavelength bands may be used in the first optical element 55$f$ or the second optical element 55$s$. The synthesis optical system 55 may combine and synthesize external shapes of lights emitted from the respective light emitting optical systems, and is not limited to the configuration of the ninth embodiment or the above configuration.

As described above, according to the present invention, a vehicle illumination lamp that is easy to operate, and a vehicle headlight that can suppress color bleeding while being reduced in size are provided, which are capable of being used in a field such as vehicle illumination lamps of automobiles or the like.

REFERENCE SIGNS LIST 1 vehicle headlight
10 housing
20 lamp unit
30 heat sink
40 cooling fan
51R first light emitting optical system
51G second light emitting optical system
51B third light emitting optical system
52R, 52G, 52B light source
54R, 54G, 54B diffraction grating
55 synthesis optical system
55$f$ first optical element
55$s$ second optical element

The invention claimed is:
1. A vehicle illumination lamp, comprising:
a light source; and
a diffraction grating for diffracting light incident from the light source,
wherein light emitted from the diffraction grating is irradiated in a light distribution pattern having a predetermined light intensity distribution of a vehicle headlamp, and in a projection area of light advancing and passing through the diffraction grating among the light distribution pattern, a light intensity of light diffracted by the diffraction grating and irradiated on the projection area is made smaller than a light intensity of light irradiated to an outside peripheral edge of the projection area.

2. The vehicle illumination lamp according to claim 1, wherein a total value of the light intensity of light diffracted by the diffraction grating and irradiated on the projection area and a light intensity of light advancing and passing through the diffraction grating and irradiated on the projection area is made lower than a highest light intensity within a light intensity distribution of light diffracted by the diffraction grating.

3. The vehicle illumination lamp according to claim 2, wherein the light intensity of light diffracted by the diffraction grating and irradiated on the projection area is zero.

4. The vehicle illumination lamp according to claim 1, wherein the projection area is included within an area having a light intensity higher than half a value of a highest light intensity within a light intensity distribution of light diffracted by the diffraction grating.

5. The vehicle illumination lamp according to claim 4, wherein the projection area includes a position having a highest light intensity within the light intensity distribution of light diffracted by the diffraction grating.

6. The vehicle illumination lamp according to claim 1, further comprising:
   a plurality of light emitting optical systems including one light source and one diffraction grating; and
   a synthesis optical system for synthesizing light emitted from the respective light emitting optical systems,
   wherein the light sources in the respective light emitting optical systems emit light of mutually different predetermined wavelengths, and the diffraction gratings in the respective light emitting optical systems emit light from the light sources so that the light synthesized by the synthesis optical system has the light distribution pattern.

7. The vehicle illumination lamp according to claim 6, wherein lights advancing and passing through the diffraction gratings in the respective light emitting optical systems are synthesized by the synthesis optical system, and irradiated on the projection area.

8. The vehicle illumination lamp according to claim 1, further comprising:
   a plurality of light emitting optical systems including one light source and one diffraction grating,
   wherein the light sources in the respective light emitting optical systems emit light of mutually different predetermined wavelengths, and the diffraction gratings in the respective light emitting optical systems emit light from the light sources so as to have the light distribution pattern at a position separated a predetermined distance from a vehicle.

\* \* \* \* \*